(12) United States Patent
Han et al.

(10) Patent No.: US 9,313,779 B2
(45) Date of Patent: Apr. 12, 2016

(54) UPLINK CONTROL INFORMATION TRANSMISSION WITH LARGE NUMBER OF BITS

(71) Applicant: Intel Corporation, Santa Clara, CA (US)

(72) Inventors: Seunghee Han, Seoul (KR); Hong He, Beijing (CN); Shafi Bashar, Santa Clara, CA (US); Jong-Kae Fwu, Sunnyvale, CA (US); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 13/953,521

(22) Filed: Jul. 29, 2013

(65) Prior Publication Data
US 2014/0029533 A1    Jan. 30, 2014

Related U.S. Application Data

(60) Provisional application No. 61/676,775, filed on Jul. 27, 2012, provisional application No. 61/679,627, filed on Aug. 3, 2012.

(51) Int. Cl.
*H04W 72/04* (2009.01)
*H04L 1/18* (2006.01)
*H04W 52/14* (2009.01)
*H04L 5/00* (2006.01)

(52) U.S. Cl.
CPC ............ *H04W 72/0413* (2013.01); *H04L 1/18* (2013.01); *H04W 52/146* (2013.01); *H04L 5/0055* (2013.01); *H04L 5/0057* (2013.01)

(58) Field of Classification Search
None
See application file for complete search history.

(56) References Cited

U.S. PATENT DOCUMENTS

| | | | | |
|---|---|---|---|---|
| 2010/0287452 A1* | 11/2010 | Xu et al. | ........................ | 714/786 |
| 2011/0122846 A1* | 5/2011 | Yu | ...................... | H03M 13/2903 |
| | | | | 370/335 |
| 2012/0207047 A1 | 8/2012 | Liao et al. | | |
| 2012/0210187 A1* | 8/2012 | Yin et al. | ........................ | 714/751 |
| 2012/0300726 A1* | 11/2012 | Han | ........................ | H04L 5/0053 |
| | | | | 370/329 |
| 2013/0039307 A1* | 2/2013 | Han | ........................ | H04L 1/1861 |
| | | | | 370/329 |
| 2013/0136071 A1* | 5/2013 | Han | ........................ | H04L 5/0019 |
| | | | | 370/329 |
| 2013/0208665 A1* | 8/2013 | Baldemair et al. | ............ | 370/329 |
| 2013/0301550 A1* | 11/2013 | Kim et al. | ...................... | 370/329 |
| 2013/0343327 A1* | 12/2013 | Jang | ........................ | H04J 13/22 |
| | | | | 370/329 |

(Continued)

FOREIGN PATENT DOCUMENTS

WO    WO2012/070672 A1    5/2012

OTHER PUBLICATIONS

3GPP, "Technical Specification Group Radio Access Network; Evolved Universal Terrestrial Radio Access (E-UTRA); Physical layer procedures (Release 10)," 3GPP TS 36.213 V10.6.0, Jun. 26, 2012, LTE Advanced, Section 5, 125 pages.

(Continued)

*Primary Examiner* — Habte Mered
(74) *Attorney, Agent, or Firm* — Schwabe, Williamson & Wyatt, P.C.

(57) ABSTRACT

Embodiments of the present disclosure describe devices, methods, computer-readable media and systems configurations for transmitting periodic channel state information having large payload sizes. Other embodiments may be described and claimed.

24 Claims, 15 Drawing Sheets

(56) References Cited

U.S. PATENT DOCUMENTS

2014/0078974 A1* 3/2014 Falahati ............... H04L 5/0055
370/329
2014/0274087 A1* 9/2014 Frenne et al. ............. 455/452.1

OTHER PUBLICATIONS

3GPP, "Technical Specification Group Radio Access Network; Evolved Universal Terrestrial Radio Access (E-UTRA); Multiplexing and channel coding (Release 10)," 3GPP TS 36.212 V10.6.0, Jun. 26, 2012, Section 5, 79 pages.

3GPP, "Technical Specification Group Radio Access Network; Evolved Universal Terrestrial Radio Access (E-UTRA); Physical Channels and Modulation (Release 10)," 3GPP TS 36.211 V10.5.0, Jun. 26, 2012, Table 5A-1, Section 5.4, 101 pages.

International Search Report and Written Opinion mailed Nov. 27, 2013 from International Application No. PCT/US2013/053663.

Qualcomm Incorporated, "On reducing periodic CSI dropping for CA operation," 3GPP TSG RAN WG1 #69, R1-122762, May 21-25, 2012, Prague, Czech Republic, 9 pages.

Texas Instruments, "Design aspects of multiplexing CSI and multi-cell HARQ-ACK on PUCCH," 3GPP TSG RAN WG1 #69, R1-122730, May 21-25, 2012, Prague, Czech Republic, 5 pages.

Huawei, Hisilicon, "Channel coding for periodic CSI and HARQ-ACK on PUCCH format 3," 3GPP TSG RAN WG1 Meeting #69, R1-122516, R1-122516, Prague, Czech Republic, 8 pages.

Samsung, "Multi-Cell Periodic CSI Reporting," 3GPP TSG RAN WG1 #69, R1-122212, May 21-25, 2012, Prague, Czech Republic, 5 pages.

* cited by examiner

UPLINK CONTROL INFORMATION TRANSMISSION WITH LARGE NUMBER OF BITS

CROSS REFERENCE TO RELATED APPLICATIONS

The present application claims priority to U.S. Provisional Patent Application No. 61/676,775, filed Jul. 27, 2012, entitled "ADVANCED WIRELESS COMMUNICATION SYSTEMS AND TECHNIQUES," and to U.S. Provisional Patent Application No. 61/679,627, filed Aug. 3, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of wireless communications, and more particularly, to uplink control information transmission with large number of bits.

BACKGROUND

Channel state information (CSI) may be dropped in a variety of situations such as, for example, due to collision with higher-priority uplink control information. This may prevent an eNB from benefiting from CSI feedback from the UE in some serving cells. Therefore, it has been proposed that multi-cell periodic CSI be transmitted on a physical uplink shared channel (PUSCH). Multi-cell periodic CSI transmission refers to aggregated CSIs being transmitted in a subframe with a certain format. However, the transmission of multi-cell periodic CSI using PUSCH may be associated with the following issues.

Since at least one physical resource block (PRB) may be needed for the transmission, only one user equipment (UE) may be multiplexed. Further, a PUSCH-based solution may not enjoy the transmit diversity that can enhance the block error rate (BLER) performance significantly since there may not be any transmit diversity scheme for PUSCH.

Frequency hopping across slots within a subframe can provide frequency diversity gain. The hopping mode between inter-subframe hopping and intra- and inter-frequency hopping mode may be configured by cell-specific radio resource control (RRC) signaling. Given that the most UEs will not apply intra-subframe frequency hopping by using orthogonal code cover (OCC) on demodulation reference signal (DM RS) across the slots, a UE implementing the PUSCH-based solution may not be likely to use intra-frequency hopping.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for transmitting uplink control information (UCI) with a large number of bits. Some embodiments provide for transmitting the UCI with physical uplink control channel (PUCCH) format 3.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
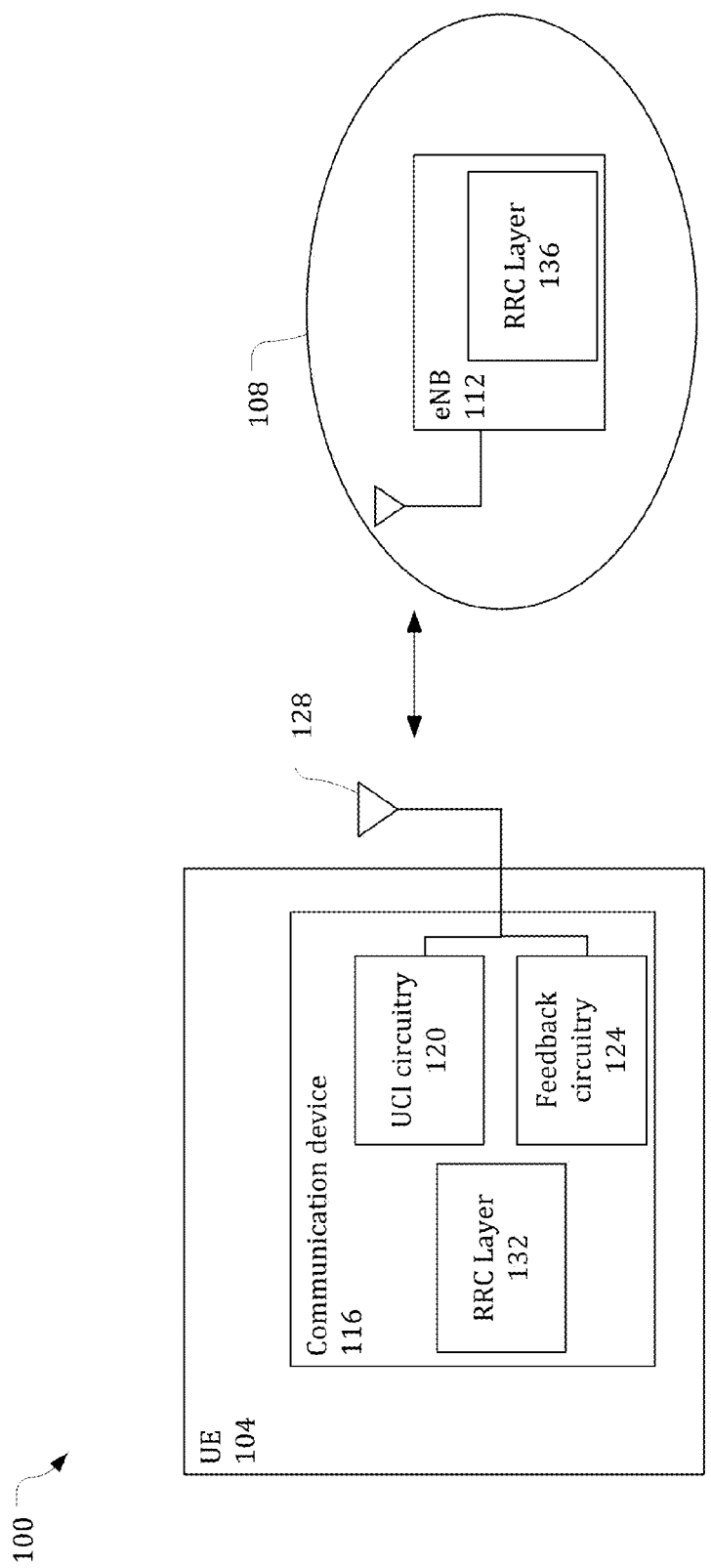
FIG. 1 schematically illustrates a network environment in accordance with various embodiments.

FIG. 1 schematically illustrates a network environment 100 in accordance with various embodiments. The network environment 100 includes a user equipment (UE) 104 wirelessly coupled with a radio access network (RAN) 108. The RAN 108 may include an enhanced node base station (eNB) 112 configured to communicate with the UE 104 via an over-the-air (OTA) interface. The RAN 108 may be part of a 3GPP LTE Advanced (LTE-A) network and may be referred to as an evolved universal terrestrial radio access network (EU-TRAN). In other embodiments, other radio access network technologies may be utilized.

The UE 104 may include a communication device 116 that implements various communication protocols in order to effectuate communication with the RAN 108. The communication device 116 may be a chip, chipset, or other collection of programmed and/or preconfigured circuitry. In some embodiments, the communication device 116 may include or be part of baseband circuitry, a radio transceiver circuitry, etc.

The communication device 116 may include uplink control information (UCI) circuitry 120 and feedback circuitry 124 coupled with each other and further coupled with one or more antennas 128.

The UCI circuitry 120 may implement various feedback processes such as, but not limited to, hybrid automatic repeat request-acknowledgment (HARQ-ACK) processes and CSI processes. For example, in some embodiments, the UCI circuitry 120 may determine whether downlink data was correctly received on a physical downlink shared channel (PDSCH) and generate acknowledgement information that includes acknowledgement/negative acknowledgement (ACK/NACK) bits (which may also be referred to as HARQ-ACK bits) to indicate whether codewords or transport blocks (TBs) of a downlink transmission were successfully received. In some embodiments, the UCI circuitry 120 may generate one ACK/NACK bit for a single codeword downlink transmission and two ACK/NACK bits for a two-codeword downlink transmission. In some embodiments, the HARQ-ACK processes may be in accordance with relevant technical specifications, for example, 3GPP Technical Specification (TS) 36.213 V10.6.0 (26 Jun. 2012).

The UCI circuitry 120 may also control generation and transmission of various CSI components that relate to channel state. The CSI components could include, but are not limited to, channel quality indicator (CQI), precoding matrix indicator (PMI), rank indicator (RI), and precoding type indicator (PTI). In some embodiments, the CSI feedback may be in accordance with relevant technical specifications, for example, 3GPP TS 36.213.

In some embodiments, the UE 104 may be semi-statically configured by higher layers, for example, a radio resource control (RRC) layer, to periodically feedback the various CSI components on a physical uplink control channel (PUCCH). The UE 104 may include an RRC layer 132 that receives various RRC parameters from an RRC layer 136 of the network and configures other components of the communication device 116, for example, the UCI circuitry 120 or feedback circuitry 124, accordingly. The RRC layer 136 may reside in the eNB 112, as shown, or other network equipment. Further, references to "higher layers" found in this description may include a reference to RRC layers, residing in UE or network equipment, in some embodiments.

As discussed above, various circumstances may occur in which CSI is dropped resulting in a less desirable operation of the eNB 112. While PUSCH has been proposed for use to drop less CSI, it is also associated with a number of challenges as noted above. Therefore, present embodiments describe use of PUCCH format 3 for transmitting CSI. One transmitter (1Tx) PUCCH format 3 may be capable of transmitting 48 encoded bits per subframe using quadrature phase shift keying (QPSK) modulation. If p-CSI from each serving cell is 11 bits, then p-CSI from four serving cells may be transmitted, resulting in 44 bits of p-CSI per subframe. As used herein, reference to a number of bits may refer to a number of encoded bits unless the context dictates otherwise. As will be understood, the number of unencoded bits that corresponds to the number of encoded bits will depend on a coding rate.

In some embodiments, use of PUCCH format 3 for transmitting CSI may allow five UEs to be multiplexed by single carrier-frequency division multiple access (SC-FDMA) (or orthogonal frequency division multiplexing (OFDM)) symbol-level code division multiplexing (CDM); use of transmit diversity schemes with a plurality of antennas, such as spatial orthogonal resource transmit diversity (SORTD); and use of frequency hopping across slots. The performance of PUCCH format 3 may be further enhanced by use of an advanced receiver that uses, for example, reference signal (RS) and data symbols jointly for detection of UCI. This may be consistent with description found in "Performance evaluation of UL ACK/NACK multiplexing methods in LTE-A," 3GPP TSG RAN WG1 Meeting #6bis, R1-103468, Dresden, Germany, 28 Jun.-2 Jul. 2010.

With the current formation of PUCCH format 3, the number of information bits for transmission is up to 22 bits by using dual Reed Muller (RM) encoding. Various embodiments configure the UE 104 to account for scenarios in which UCI may include more than 22 bits, for example, multi-cell p-CSI transmissions.

Parameters for p-CSI may be configured for each serving cell. Therefore, relevant parameters may be provided individually for each serving cell for a UE supporting multi-cell p-CSI transmission. Also, since using PUCCH format 3 may be configured by RRC signaling, multi-cell p-CSI transmission using PUCCH format 3 may be configured by RRC signaling. In configuring a UE, the explicit resource for PUCCH format 3, rather than PUCCH format 2, may be configured.

While many of the embodiments are described in the context of carrier aggregation, with multiple p-CSI sets respectively corresponding with multiple serving cells, other embodiments may additionally/alternatively be applied to coordinated multipoint (CoMP) communications. In such embodiments, the UCI may include one or more p-CSI sets that respectively correspond with one or more CSI processes. A CSI process may be a combination of a non-zero power (NZP) CSI-reference signal (RS) and an interference measure resource (IMR), which may occupy a subset of resource elements (REs) configured as a zero-power CSI-RS.

Figure 2:
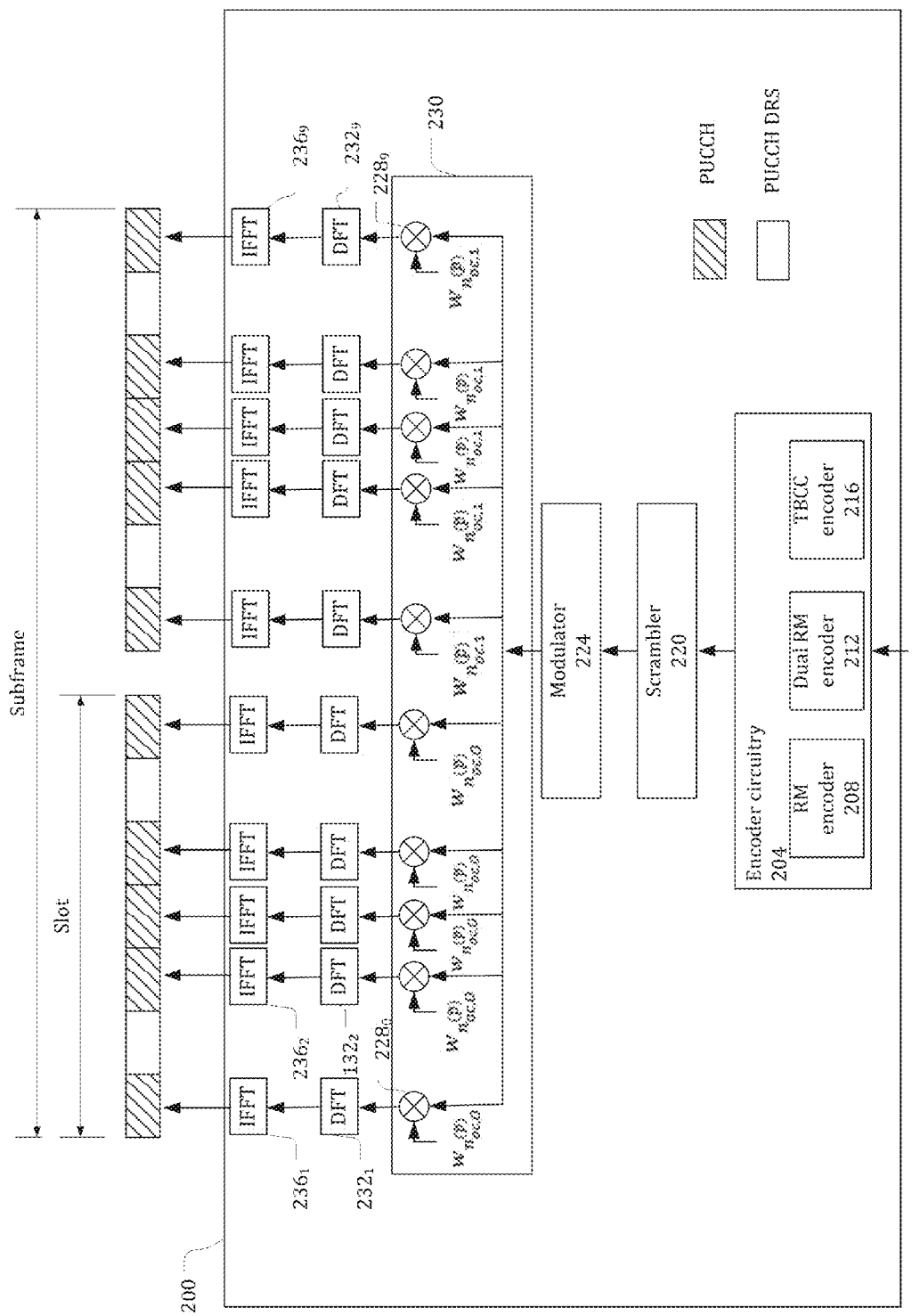
FIG. 2 illustrates transmit circuitry in accordance with various embodiments.

FIG. 2 illustrates Tx circuitry 200, which may be included in feedback circuitry 124 in accordance with some embodiments. The Tx circuitry 200 may be configured to transmit information according to PUCCH format 3.

The Tx circuitry 200 may include encoder circuitry 204 that is to receive UCI bits, for example, ACK/NACK bits and/or p-CSI bits, and encode the UCI bits. The encoder circuitry may include an RM encoder 208, a dual RM encoder 212, and a TBCC encoder 216. It may be noted that some components of the encoders may be shared with one another. For example, the RM encoder 208 may be part of the dual RM encoder 212.

The encoder circuitry 204 may select the encoder to use based on a number of encoded UCI bits to convey the UCI, which may include p-CSI and, possibly, SR information. For example, if the encoder circuitry 204 determines the number of encoded bits to convey the UCI is less than or equal to 11 it may select an RM channel coding scheme implemented by the RM encoder 208; if the encoder circuitry 204 determines the number of UCI bits is greater than 11 and less than 23, it may select a dual RM channel coding scheme provided by the dual RM encoder 212; and if the encoder circuitry 204 determines the number of UCI bits is greater than 22, it may select a TBCC channel coding scheme provided by the TBCC encoder 216. So, for example, if p-CSI from one or two cells was to be transmitted in a subframe RM encoder 208 or dual RM encoder 212 may be used and if p-CSI from three or four cells (e.g., 33-44 UCI bits), then the TBCC encoder 216 may be used.

When the number of UCI bits is greater than a predetermined UCI payload capacity, for example, 44 or 48 bits, the encoder circuitry 204 may employ a dropping rule. In some embodiments, a dropping rule of p-CSI for the serving cells may be applied according to the UCI payload capacity for PUCCH format 3, rather than the number of configured serving cells. The dropping rule may be as follows. If the multi-cell p-CSI bits, A, in a subframe are not more than the predetermined UCI payload capacity for PUCCH format 3 (for example, A<=44 bits), all the multi-cell p-CSIs may be aggregated and transmitted using PUCCH format 3. Else, for example, A>44, the multi-cell periodic CSI bits may be selected such that the aggregated UCI payload is the greatest number not more than 44 bits. The p-CSI bits that are dropped may be based on a CSI reporting type of the various serving cells. The priority of the CSI reporting type may be: 1st (=Top) priority—Types 3, 5, 6, 2a; 2nd priority—Types 2, 2b, 2c, 4; and 3rd priority—Types 1, 1a. The UCI reporting priorities among serving cells with the same reporting type may be determined based on the serving cell indices, for example, ServCellIndex. Priority of a cell may decrease as the corresponding serving cell index increases.

After encoding of the bit stream, by the selected encoder, the encoded bit stream, denoted by b(0), ..., b($M_{bit}$−1), where $M_{bit}$=48, may be provided to a scrambler 220 of the Tx circuitry 200. The scrambler 220 may scramble the encoded bits with a cell-specific scrambling sequence. The encoded bit stream, may be scrambled according to $$\tilde{b}(i)=+c(i)) \bmod 2, \qquad \text{Eq. 1}$$

where $\tilde{b}(i)$ is the scrambled bits, b(i) is the encoded bits, and c(i) is a scrambling sequence, e.g., a pseudo-random sequence (for example, a Gold sequence, pseudo-noise (PN) sequence, Kasami sequence, etc.).

The scrambling sequence generator may be initialized with $c_{init}=(\lfloor n_s/2 \rfloor+1)\cdot(2N_{ID}^{cell}+1)\cdot 2^{16}+n_{RNTI}$ at a start of each subframe where $n_{RNTI}$ is the C-RNTI.

The block of scrambled bits $\tilde{b}(0), \ldots, \tilde{b}(M_{bit}-1)$ may be modulated by modulator 224 using a QPSK modulation, resulting in a block of complex-valued symbols d(0), ..., d($M_{symb}$−1) where $M_{symb}=M_{bit}/2=2N_{SC}^{RB}$, where $N_{SC}^{RB}$ is a number of subcarriers in a resource block and may equal 12.

The complex-valued symbols d(0), ..., d($M_{symb}$−1) may be block-wise spread by multipliers $228_{0-9}$ of a mapper 230 with orthogonal sequences $w_{n_{oc,0}}^{(\tilde{p})}$ $w_{n_{oc,1}}^{(\tilde{p})}$ resulting in $$N_{SF,0}^{PUCCH} + N_{SF,1}^{PUCCH} \text{ sets of } N_{SC}^{RB} \text{ values each according to}$$

$$y_n^{(\tilde{p})}(i) = \begin{cases} w_{n_{oc,0}^{(\tilde{p})}}(\bar{n}) \cdot e^{j\pi \lfloor n_{cs}^{cell}(n_S,l)/64 \rfloor/2} \cdot d(i) & n < N_{SF,0}^{PUCCH} \\ w_{n_{oc,1}^{(\tilde{p})}}(\bar{n}) \cdot e^{j\pi \lfloor n_{cs}^{cell}(n_S,l)/64 \rfloor/2} \cdot d(N_{sc}^{RB}+i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

where $N_{SF,0}^{PUCCH}=N_{SF,1}^{PUCCH}=5$ for both slots in a subframe using normal PUCCH format 3 and $N_{SF,0}^{PUCCH}=5$ and $N_{SF,1}^{PUCCH}=4$ for the first and second slot, respectively, in a subframe using shortened PUCCH format 3. The orthogonal sequences $w_{n_{oc,0}}^{(\tilde{p})}$ and $w_{n_{oc,1}}^{(\tilde{p})}$ may be given by Table 1.

TABLE 1

| Sequence index | Orthogonal sequence [$w_{n_{oc}}(0) \ldots w_{n_{oc}}(N_{SF}^{PUCCH}-1)$] | |
|---|---|---|
| $n_{oc}$ | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

Resources used for transmission of PUCCH format 3 may be identified by a resource index $n_{PUCCH}^{(3,\tilde{p})}$ from which the quantities $n_{oc,0}^{(\tilde{p})}$ and $n_{oc,1}^{(\tilde{p})}$ are derived according to $$n_{oc,0}^{(\tilde{p})} = n_{PUCCH}^{(3,\tilde{p})} \bmod N_{SF,1}^{PUCCH}$$

$$n_{oc,1}^{(\tilde{p})} = \begin{cases} (3n_{oc,0}^{(\tilde{p})}) \bmod N_{SF,1}^{PUCCH} & \text{if } N_{SF,1}^{PUCCH} = 5 \\ n_{oc,0}^{(\tilde{p})} \bmod N_{SF,1}^{PUCCH} & \text{otherwise.} \end{cases}$$

Each set of complex-valued symbols may be cyclically shifted according to:
$\tilde{y}_n^{(\tilde{p})}(i)=y_n^{(\tilde{p})}((i+n_{cs}^{cell}(n_s,l)) \bmod N_{sc}^{RB})$ where $n_s$ is the slot number within a frame, which could vary from 0-19, $n_{cs}^{cell}(n_s,l)$ is the cyclic shift value in symbol l at slot $n_s$, and l is the SC-FDMA symbol number within a slot.

The shifted sets of complex valued symbols may be transform precoded, by discrete Fourier transformers 232, according to:

$$z^{(\tilde{p})}(n \cdot N_{sc}^{RB}+k) = \frac{1}{\sqrt{P}} \frac{1}{\sqrt{N_{sc}^{RB}}} \sum_{i=0}^{N_{sc}^{RB}-1} \tilde{y}_n^{(\tilde{p})}(i) e^{-j\frac{2\pi ik}{N_{sc}^{RB}}}$$

$$k = 0, \ldots, N_{sc}^{RB} - 1$$

$$n = 0, \ldots, N_{SF,0}^{PUCCH} + N_{SF,1}^{PUCCH} - 1,$$

where P is the is the number of antenna ports used for PUCCH transmission, resulting in a block of complex-valued symbols $z^{(\tilde{p})}(0), \ldots, z^{(\tilde{p})}((N_{SF,0}^{PUCCH}+N_{SF,1}^{PUCCH})N_{sc}^{RB}-1)$.

The block of complex-valued symbols $z^{\tilde{p}}(i)$ may be multiplied with the amplitude scaling factor $\beta_{PUCCH}$ in order to conform to the transmit power $P_{PUCCH}$, and mapped in sequence starting with $z^{\tilde{p}}(0)$ to resource elements. PUCCH may use one resource block in each of the two slots in a subframe. Within the physical resource block used for transmission, the mapping of $z^{\tilde{p}}(i)$ to resource elements (k,l) on antenna port p and not used for transmission of reference signals shall be in increasing order of first k, then l and finally the slot number, starting with the first slot in the subframe. The relation between the index $\tilde{p}$ and the antenna port number p may be shown in Table 2.

TABLE 2

| Physical channel or signal | Index $\tilde{p}$ | Antenna port number p as a function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

The physical resource blocks to be used for transmission of PUCCH in slot $n_s$ may be given by $$n_{PRB} = \begin{cases} \left\lfloor \frac{m}{2} \right\rfloor & \text{if}(m+n_s \bmod 2) \bmod 2 = 0 \\ N_{RB}^{UL} - 1 - \left\lfloor \frac{m}{2} \right\rfloor & \text{if}(m+n_s \bmod 2) \bmod 2 = 1, \end{cases}$$

where the variable m depends on the PUCCH format. For format 3, $m = \lfloor n_{PUCCH}^{(3,\tilde{p})}/N_{SF,0}^{PUCCH} \rfloor$.

Figure 3:
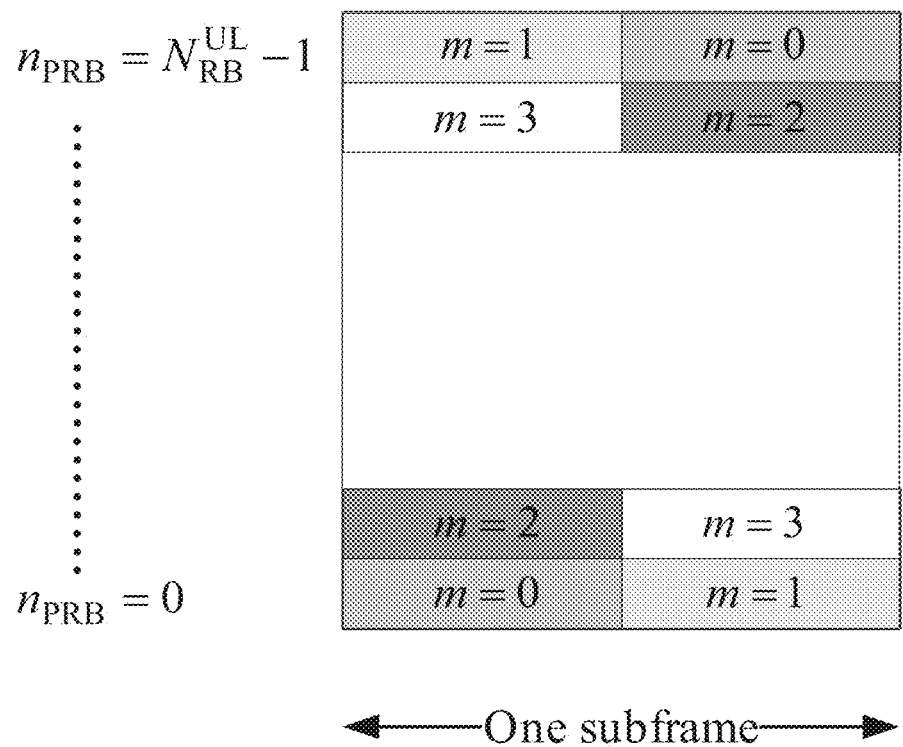
FIG. 3 illustrates mapping of modulation symbols for PUCCH in accordance with various embodiments.

Mapping of modulation symbols for the PUCCH may be illustrated in FIG. 3 in accordance with some embodiments. In case of simultaneous transmission of sounding RS and PUCCH format 1, 1a, 1b or 3 when there is one serving cell configured, a shortened PUCCH format may be used where the last SC-FDMA symbol in the second slot of a subframe is left empty.

The Tx circuitry 200 may further include respective discrete Fourier transformers (DFTs) 232 that take the signals, generated in a time domain, and allocate them in a frequency domain. The Tx circuitry 200 may further include respective inverse fast Fourier transformers (IFFTs) 236, which are typically larger than the DFTs, to convert the signals from the frequency domain into a time-domain waveform for transmission on respective PUCCH resource blocks. This may be referred to as DFT spread orthogonal frequency division multiplexing (DFTS-OFDM), which could result in a lower peak to average power ratio (PAPR). As can be seen in FIG. 2, resource blocks 1, 3, 4, 5, and 7 of the first and second slots may be PUCCH resource blocks, while resource blocks 2 and 6 are PUCCH demodulation reference signal (DRS) resource blocks.

Figure 4:
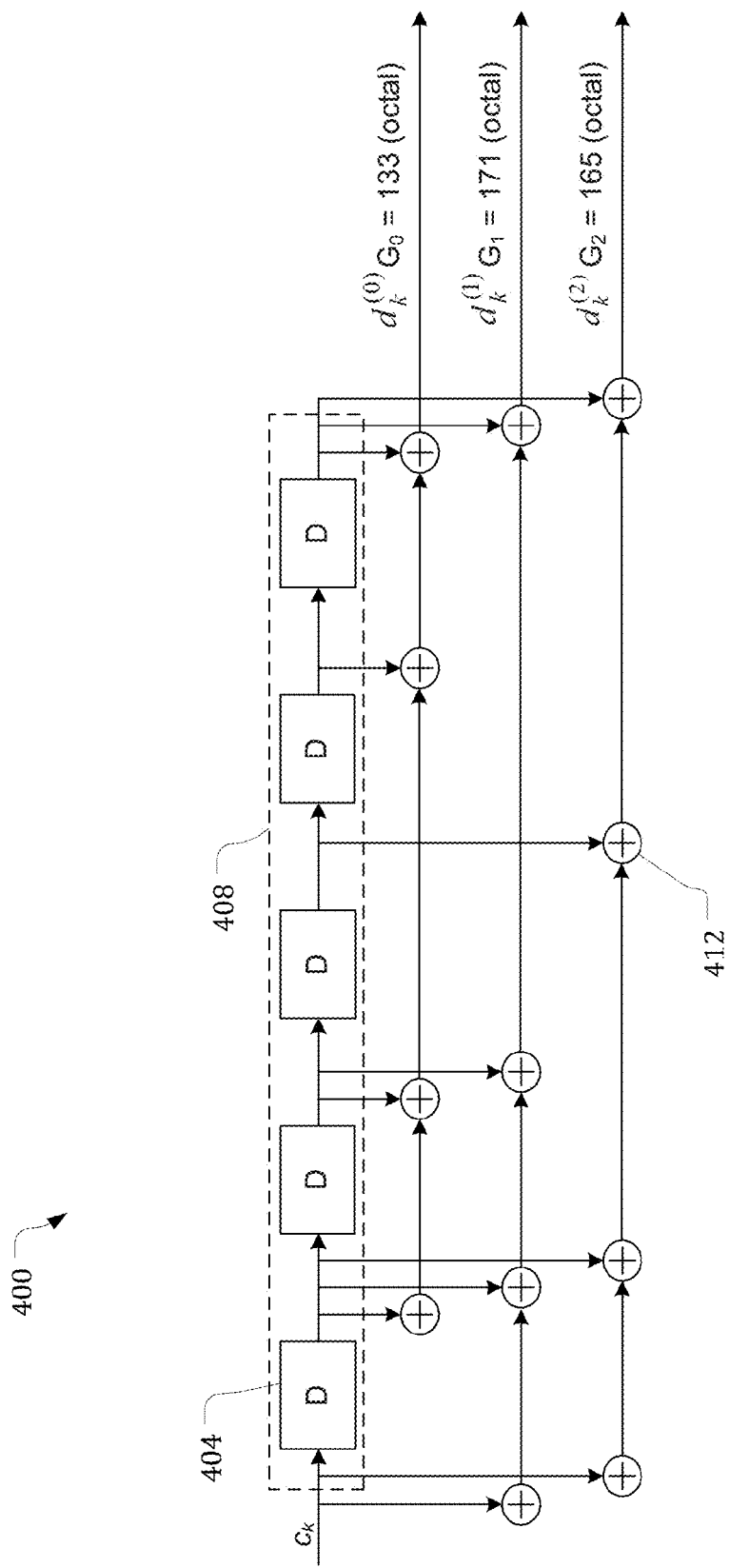
FIG. 4 illustrates an encoding section of a TBCC encoder in accordance with various embodiments.
Figure 5:
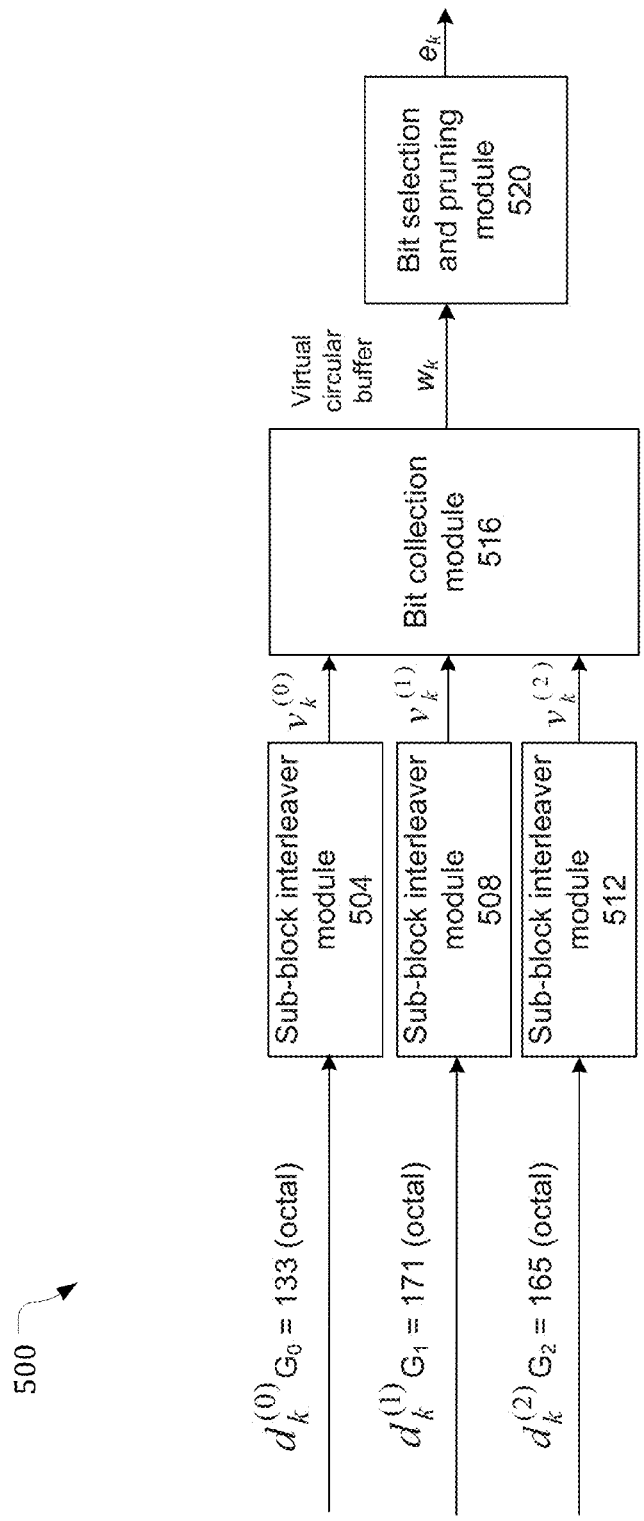
FIG. 5 illustrates a rate-matching section of a TBCC encoder in accordance with various embodiments.

FIGS. 4 and 5 respectively illustrate an encoding section 400 and a rate matching section 500 of a TBCC encoder that may be used in the encoder circuitry 204 in accordance with various embodiments. The TBCC encoder may have a mother coding rate of ⅓.

The encoding section 400 may include delay modules 404, serially coupled with one another, of a shift register 408 coupled with adder modules 412 as shown. An initial value of the shift register 408 of the encoding section 400 may be set to values corresponding to the last six information bits of an input stream, which may be the UCI bit stream, so that the initial and final stages of the shift register 408, corresponding to outputs of the first and last delay modules 404, respectively, are the same. Therefore, denoting the shift register 408 of the encoding section 400 by $s_0, s_1, s_2, \ldots, s_5$, then the initial value of the shift register may be set to $s_i = c_{(K-1-i)}$.

The encoding section output streams, $d_k^{(0)}$, $d_k^{(1)}$ and $d_k^{(2)}$, may correspond to the first, second, and third parity streams, respectively, as shown in FIG. 4.

The rate matching section 500 may include sub-block interleaver modules 504, 508, and 512 coupled with the encoding section 400 to respectively receive and subsequently interleave the output streams of the encoding section 400.

The bits input to the sub-block interleaver modules 504, 508, and 512 may be denoted by $d_0^{(i)}, d_1^{(i)}, d_2^{(i)}, \ldots, d_{D-1}^{(i)}$, where D is the number of bits. The interleaved streams may be derived as follows.

First, assign $C_{subblock}^{CC} = 32$ to be the number of columns of a matrix. The columns of the matrix may be numbered 0, 1, 2, ..., $C_{subblock}^{CC} - 1$ from left to right.

Second, determine a number of rows of the matrix $R_{subblock}^{CC}$ by finding a minimum integer $R_{subblock}^{CC}$ such that $D \leq (R_{subblock}^{CC} \times C_{subblock}^{CC})$. The rows of the rectangular matrix may be numbered 0, 1, 2, ... $R_{subblock}^{CC} - 1$ from top to bottom.

Third, if $R_{subblock}^{CC}$, then $N_D = (R_{subblock}^{CC} \times C_{subblock}^{CC} - D)$ dummy bits may be padded such that $y_k = <\text{NULL}>$ for $k=0, 1, \ldots, N_D - 1$. Then, $y_{N_D+k} = d_k^{(i)}$, $k=0, 1, \ldots, D-1$, and the bit sequence $y_k$ is written into the $(R_{subblock}^{CC} \times C_{subblock}^{CC})$ matrix row by row starting with bit $y_0$ in column 0 or row 0:

$$\begin{bmatrix} y_0 & y_1 & y_2 & \cdots & y_{C_{subblock}^{CC}-1} \\ y_{C_{subblock}^{CC}} & y_{C_{subblock}^{CC}+1} & y_{C_{subblock}^{CC}+2} & \cdots & y_{2C_{subblock}^{CC}-1} \\ \vdots & \vdots & \vdots & \ddots & \vdots \\ y_{(R_{subblock}^{CC}-1) \times C_{subblock}^{CC}} & y_{(R_{subblock}^{CC}-1) \times C_{subblock}^{CC}+1} & y_{(R_{subblock}^{CC}-1) \times C_{subblock}^{CC}+2} & \cdots & y_{(R_{subblock}^{CC} \times C_{subblock}^{CC}-1)} \end{bmatrix}$$

Fourth, perform inter-column permutation for the matrix based on the pattern $\langle P(j)\rangle_{j\in\{0,1,\ldots,C_{subblock}^{CC}-1\}}$ that is shown in Table 3,

TABLE 3

Inter-column permutation for sub-block interleaver module

| Number of columns $C_{subblock}^{CC}$ | Inter-column permutation pattern $<P(0), P(1), \ldots, P(C_{subblock}^{CC}-1)>$ |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> | where P(j) is an original column position of the $j^{th}$ permuted column. After permutation of the columns, the inter-column permuted ($R_{sunblock}^{CC} \times C_{sunblock}^{CC}$) matrix may be equal to:

$$\begin{bmatrix} y_{P(0)} & y_{P(1)} & y_{P(2)} & \cdots & y_{P(C_{subblock}^{CC}-1)} \\ y_{P(0)+C_{subblock}^{CC}} & y_{P(1)+C_{subblock}^{CC}+1} & y_{P(2)+C_{subblock}^{CC}} & \cdots & y_{P(C_{subblock}^{CC}-1)+C_{subblock}^{CC}} \\ \vdots & \vdots & \vdots & \ddots & \vdots \\ y_{P(0)+(R_{subblock}^{CC}-1)\times C_{subblock}^{CC}} & y_{P(1)+(R_{subblock}^{CC}-1)\times C_{subblock}^{CC}+1} & y_{P(2)+(R_{subblock}^{CC}-1)\times C_{subblock}^{CC}+2} & \cdots & y_{P(C_{subblock}^{CC}-1)+(R_{subblock}^{CC}-1)\times C_{subblock}^{CC}} \end{bmatrix}$$

Fifth, the output of the sub-block interleaver modules 504, 508, and 512 may be the bit sequence read out column by column from the inter-column permuted ($R_{sunblock}^{CC} \times C_{sunblock}^{CC}$) matrix. The bits after sub-block interleaving may be denoted by ($R_{sunblock}^{CC} \times C_{sunblock}^{CC}$), where $v_0^{(i)}$ corresponds to $y_{P(0)}$, $y_{P(0)+C_{sunblock}^{CC}}$ ... and $K_\Pi = (R_{sunblock}^{CC} \times C_{sunblock}^{CC})$. The interleaved streams, as shown in FIG. 5, may include $v_k^{(0)}$, $v_k^{(1)}$, and $v_k^{(2)}$ respectively provided by sub-block interleaver modules 504, 508, and 512.

The sub-block interleaver modules 504, 508, and 512 may also be used in interleaving PDCCH modulation symbols. In that case, the input bit sequence may include PDCCH symbol quadruplets.

The rate matching section 500 may further include a bit collection module 516 coupled with the sub-block interleaver modules 504, 508, and 512 to receive the interleaved streams and a bit selection and pruning module 520 coupled with the bit collection module 516.

The bit collection module 516 may provide a virtual circular buffer to provide a bit-collection bit stream having a length of $K_w = 3K_\Pi$ that is generated as follows:

$w_k = v_k^{(0)}$ for $k=0, \ldots, K_\Pi - 1$ $w_{K_\Pi + k} = v_k^{(1)}$ for $k=0, \ldots, K_\Pi - 1$ and $w_{2K_\Pi + k} = v_k^{(2)}$ for $k=0, \ldots, K_\Pi - 1$.

The rate matching output bit sequence may be $e_k$, k=0, 1, . . . , E-1, wherein E denotes the rate matching output sequence length. The bit selection and pruning module 520 may generate the rate matching output bit sequence by the following algorithm.

```
Set k=0 and j=0
while {k < E}
    if w_{jmodKw} ≠< NULL>
        e_k = w_{jmodKw}
        k=k+1
    end if
    j=j+1
end while
```

Figure 6:
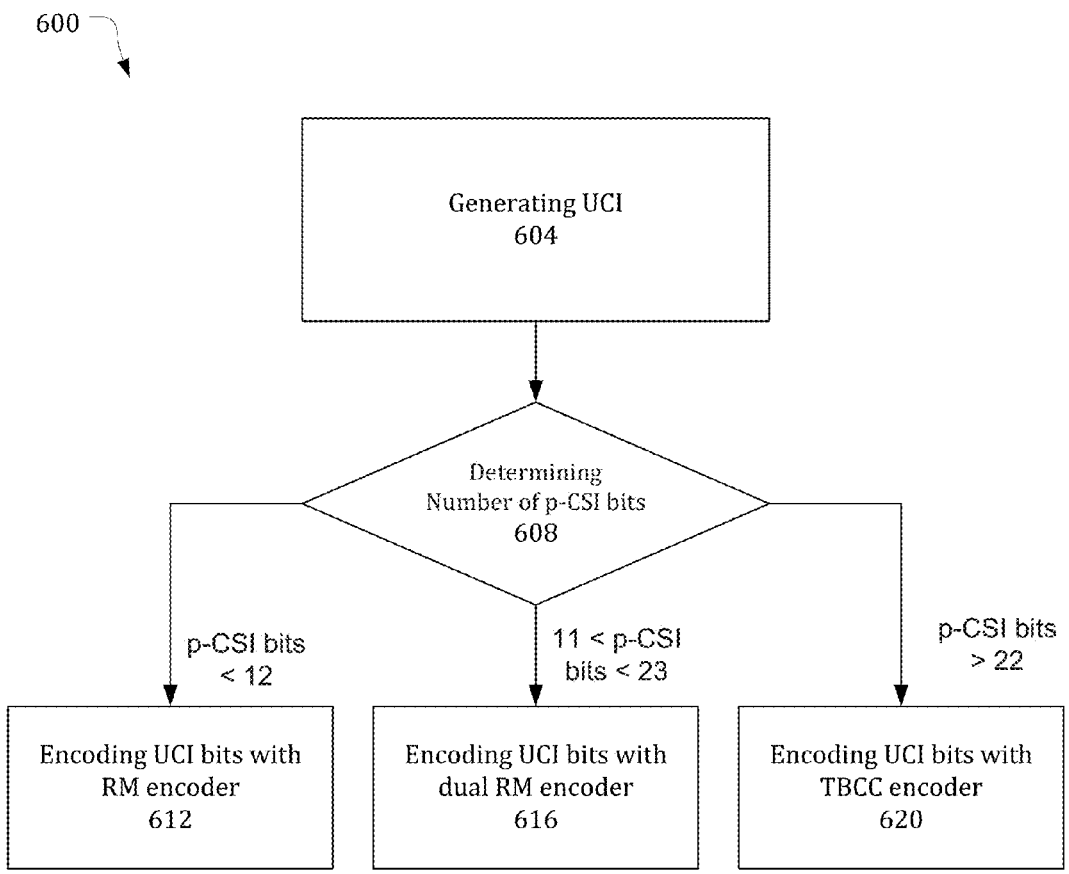
FIG. 6 illustrates a method of encoding CSI in accordance with various embodiments.

FIG. 6 illustrates a method 600 in accordance with some embodiments. Method 600 may be performed by a communication device of a UE, such as communication device 116 of UE 104. In some embodiments, the UE may include and/or have access to one or more computer-readable media having instructions stored thereon, that, when executed, cause the UE, or the communication device 116, to perform some or all of the method 600.

The method 600 may include, at 604, generating UCI. In some embodiments, the UCI may be generated by UCI circuitry, for example, UCI circuitry 120, and received by feedback circuitry, for example, feedback circuitry 124. The UCI may include single or multi-cell p-CSI, HARQ-ACK, and/or SR information.

The method 600 may include, at 608, determining a number of p-CSI bits to be transmitted in a subframe.

If, at 608, it is determined that the number of p-CSI bits is less than 12, then the method 600 may include, at 612, encoding the UCI bits with an RM encoder, for example, RM encoder 208.

If, at 608, it is determined that the number of p-CSI bits is greater than 11 and less than 23, then the method 600 may include, at 616, encoding the UCI bits with a dual RM encoder, for example, dual RM encoder 212.

If, at 608, it is determined that the number of p-CSI bits is greater than 22, then the method 600 may include, at 620, encoding the UCI bits with a TBCC encoder, for example, TBCC encoder 216.

While TBCC channel coding scheme is discussed for large payloads, other embodiments may utilize additional/alternative channel coding schemes. For example, some embodiments may use turbo channel coding scheme, a low-density parity check (LDPC) channel coding scheme, etc.

Although the channel coding rate by TBCC encoder 216 may be more than ½, symbol-by-symbol repetition coding, which may be used to apply orthogonal cover code (OCC), can work as a complementary channel coding scheme, where the overall effective coding rate with ½ TBCC coding rate for this structure becomes 1/10 (=1/(2*5)) in PUCCH format 3. Further, the feedback circuitry may use a plurality of transmitters configured to provide a plurality of PUCCH-resource based transmissions using more than one transmit antenna to increase spatial transmit diversity to further enhance BLER performance. This may be referred to as SORTD. In some embodiments, SORTD may be used by repeating encoded bits into more than one Tx antenna domain.

Frequency hopping across slots may be turned off by predetermined or dedicated RRC signaling. In general, the coding rate below ½ may be desirable for PUCCH format 3 due to the frequency hopping across slots. Thus, when using TBCC encoding, frequency hopping may be turned off (FREQHOPOFF+TBCC). Further, when using TBCC encoding with frequency hopping turned off, SORTD may be used (FREQHOPOFF+TBCC+SORTD).

TBCC channel coding may be applied when the UE is configured with SORTD for PUCCH format 3. For example, if SORTD is not configured, and the information is not more than 22 bits, RM or dual RM channel coding may used with a single antenna transmission and multi-cell CSI transmission may not be supported for more than 21 bits.

With SORTD configured, if the information is not more than 22 bits, RM or dual RM may be used with single antenna transmission; and, if the information is more than 22 bits, TBCC may be used with SORTD.

The use of TBCC may be configured by RRC layers. For example, RRC layer 136 may configure the p-CSI transmission for large payload by transmitting a parameter, e.g., LargePayloadPCSITransmission parameter, to the RRC layer 132 to indicate that the UE 104 is to employ TBCC for large payload p-CSI transmissions.

Table 4 provides link level simulation assumptions that may be used to describe embodiments of the present invention.

TABLE 4

| Parameters | Value |
| --- | --- |
| Carrier frequency | 2 GHz |
| System bandwidth | 5 MHz |
| Channel model | Extended pedestrian A (EPA) 3 km/h |
| Frequency hopping | OFF |
| Antenna set up | 1Tx-2Rx (for PUSCH) vs. 2Tx-2Rx (SORTD for proposed scheme) |
| Tx/Rx antenna correlation | Uncorrelated |
| Channel estimation | Practical |
| CP type | Normal cyclic prefix (CP) |
| Signal bandwidth | 180 kHz |
| Noise estimation | Ideal |
| Used format | PUSCH-based, PUCCH-based |
| CSI bits | 24 bits |
| Receiver | Minimum mean squared error (MMSE) |
| Channel coding | TBCC |
| Remaining details | See 3GPP TS 36.211 v10.5.0 (26 Jun. 2012), 3GPP TS 36.212 v10.6.0 (26 Jun. 2012), and TS36.213 |
| Requirements | BLER <= 1% |

Figure 7:
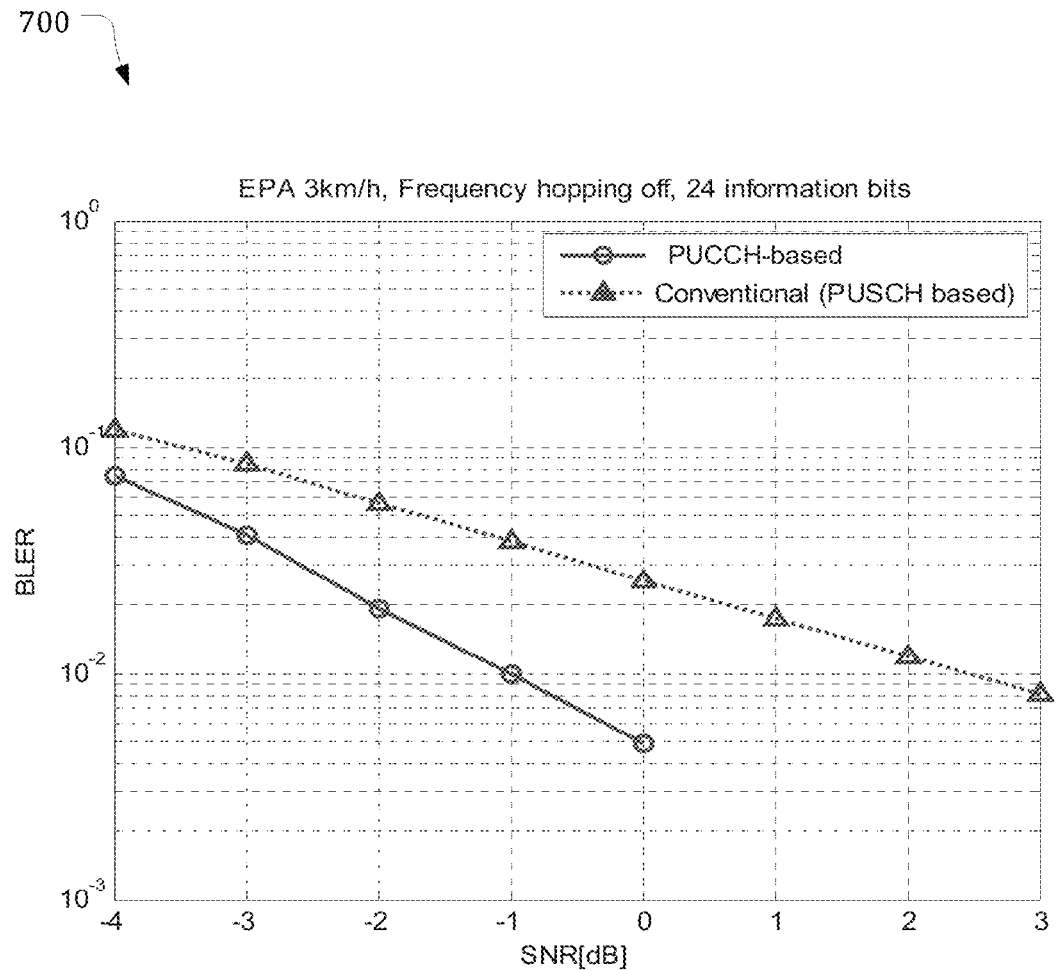
FIG. 7 is a graph showing simulation results for PUCCH-based CSI feedback in accordance with some embodiments and PUSCH-based CSI feedback for 24 information bits under 3 EPA km/h.

FIG. 7 is a graph 700 showing simulation results for PUCCH-based CSI feedback in accordance with embodiments and conventional, PUSCH-based CSI feedback for 24 information bits under 3 EPA km/h. The signal-to-noise ratio (SNR) gain associated with the PUCCH-based CSI feedback over PUSCH-based CSI feedback is significant, for example, 3.49 dB at 1% BLER.

Figure 8:
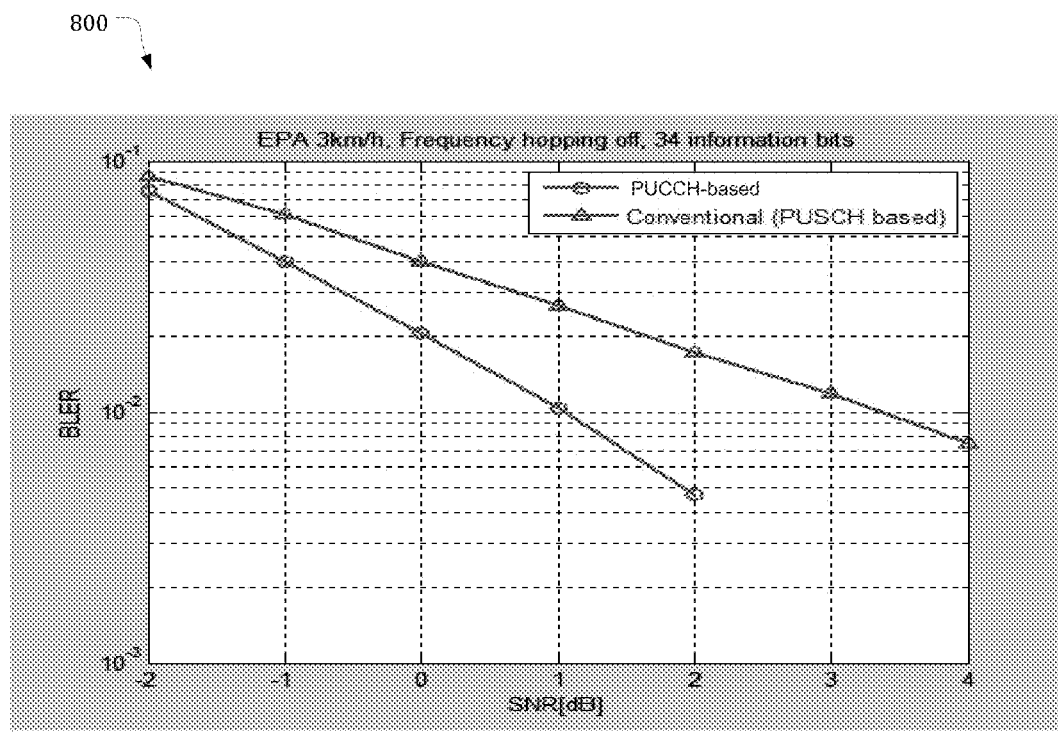
FIG. 8 is a graph showing simulation results for PUCCH-based CSI feedback in accordance with embodiments and PUSCH-based CSI feedback for 34 information bits under 3 EPA km/h.

FIG. 8 is a graph 800 showing simulation results for PUCCH-based CSI feedback in accordance with embodiments and PUSCH-based CSI feedback for 34 information bits under 3 EPA km/h. The signal-to-noise ratio (SNR) gain associated with the PUCCH-based CSI feedback over PUSCH-based CSI feedback is also significant, for example, 2.36 dB at 1% BLER.

Some embodiments may include 48 encoded bits. The first 24 encoded bits may be mapped to a first SC-FDMA symbol in a first slot by QPSK modulation and the last 24 encoded bits may be mapped to a second SC-FDMA symbol in a second slot by QPSK modulation. For normal CP, the first 12 QPSK symbols in the first SC-FDMA symbol may be copied to the second-fifth data SC-FDMA symbols for each slot. Then, a length-5 orthogonal cover code (OCC) may be applied in each slot for CDM UE multiplexing. After that, SORTD may be employed by using two orthogonal resources with 2Tx antennas as described above.

In some embodiments, the encoded bits may be spread into two orthogonal resources and each orthogonal resource can be transmitted on each antenna. Unlike the above embodiments, the modulation symbols for each antenna at each virtual carrier may be different from one another.

Figure 9:
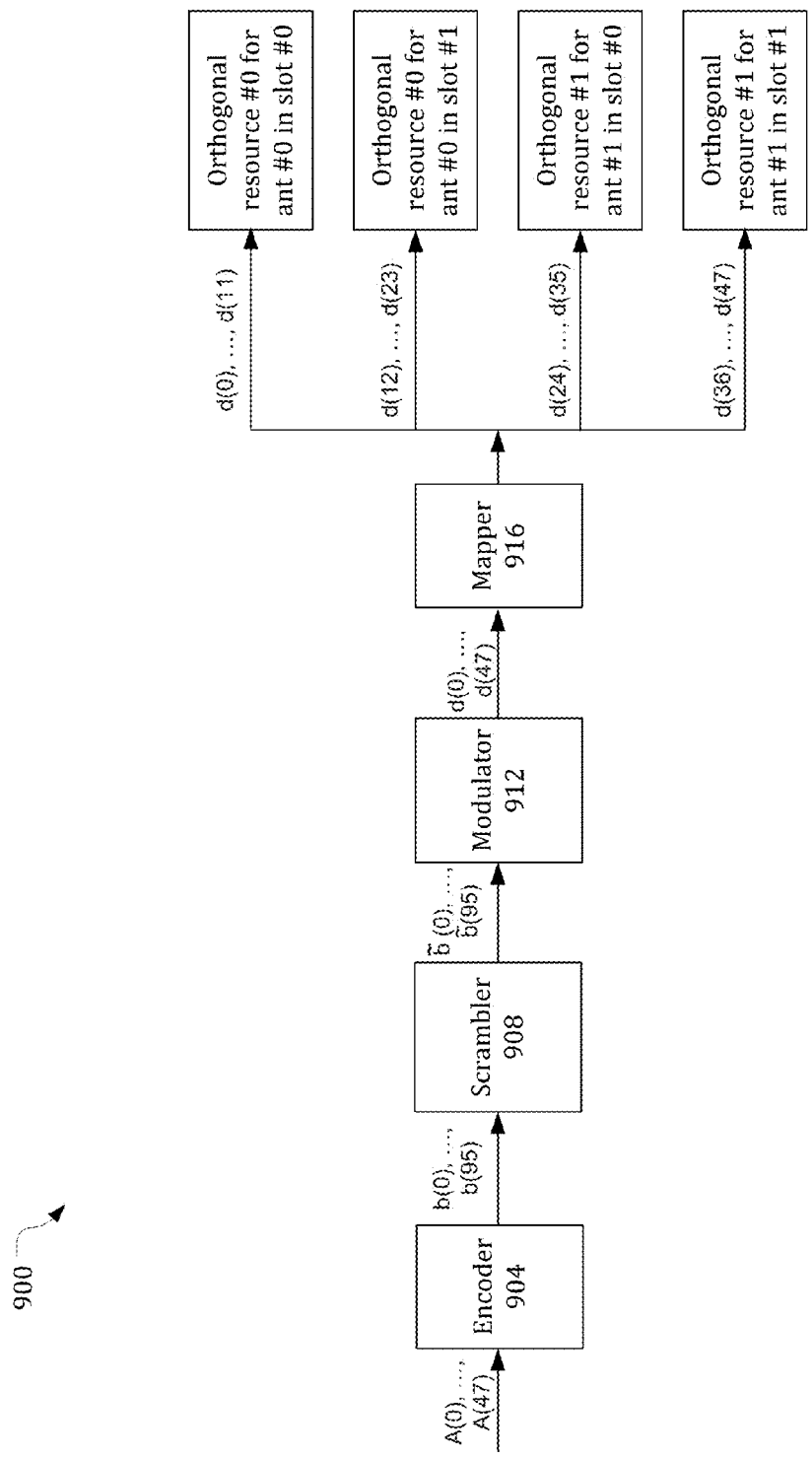
FIG. 9 illustrates transmit circuitry in accordance with various embodiments.

FIG. 9 illustrates Tx circuitry 900 in accordance with some embodiments. Tx circuitry 900, which may be included in feedback circuitry 124, may be configured to transmit information according to PUCCH format 3. Operations of the components of Tx circuitry 900 may be similar to operation of similar components described in other embodiments with any differences noted.

Tx circuitry 900 may include a TBCC encoder 904 that may receive 48 information bits, A(0), . . . , A(47)), and encode the information bits using TBCC encoding, with a ½ code rate, to provide 96 encoded bits, denoted by b(0), . . . , b($M_{bit}$–1), where $M_{bit}$=96 as reflected in FIG. 9.

The Tx circuitry 900 may include a scrambler 908 to receive the encoded bits and scramble them with a UE-specific scrambling sequence resulting in a block of scrambled bits $\tilde{b}(0), \ldots, \tilde{b}(M_{bit}–1)$.

The Tx circuitry 900 may include a modulator 912 to receive the scrambled bits and to modulate them, with QPSK modulation, resulting in a block of complex-valued modulation symbols, d(0), . . . , d($M_{symb}$–1) where $M_{symb}=M_{bit}/2=2N_{sc}^{RB}$, where $N_{sc}^{RB}=12$ Tx circuitry 900 may include a mapper 916 to block-wise spread the complex-valued symbols with orthogonal sequences $w_{n_{oc,0}}(\tilde{p})$ and $w_{n_{oc,1}}(\tilde{p})$ resulting in $N_{SF,0}^{PUCCH} + N_{SF,1}^{PUCCH}$ sets of $N_{SC}^{RB}$ values each according to $$y_n^{(\tilde{p})}(i) = \begin{cases} w_{n_{oc,0}}^{(\tilde{p})}(\bar{n}) \cdot e^{j\pi[n_{cs}^{cell}(n_S,l)/64]/2} \cdot d(2 \cdot N_{sc}^{RB}\tilde{p} + i) & n < N_{SF,0}^{PUCCH} \\ w_{n_{oc,1}}^{(\tilde{p})}(\bar{n}) \cdot e^{j\pi[n_{cs}^{cell}(n_S,l)/64]/2} \cdot d(2 \cdot N_{sc}^{RB}\tilde{p} + N_{sc}^{RB} + i) & \text{otherwise} \end{cases}$$

$\bar{n} = n \mod N_{SF,0}^{PUCCH}$ $n = 0, \ldots, N_{SF,0}^{PUCCH} + N_{SF,1}^{PUCCH} - 1$ $i = 0, 1, \ldots, N_{sc}^{RB} - 1$ where $N_{SF,0}^{PUCCH}=N_{SF,1}^{PUCCH}=5$ for both slots in a subframe using normal PUCCH format 3 and $N_{SF,0}^{PUCCH}=5$ and $N_{SF,1}^{PUCCH}=4$, holds for the first and second slot, respectively, in a subframe using shortened PUCCH format 3. The orthogonal sequences $w_{n_{oc,0}}(\tilde{p})$ and $w_{n_{oc,1}}(\tilde{p})$ may be given by Table 1.

Identification of the resources used for transmission of PUCCH formats 3, cyclic shifting of the complex-valued symbols, and transform precoding may be done similar to manners described above.

In this embodiment, [d(0), . . . , d(11)] may be mapped to a first orthogonal resource (#0) for transmission by a first antenna (#0) in a first slot (#0); [d(12), . . . , d(23)] may be mapped to the first orthogonal resource for transmission by the first antenna in a second slot (#1); [d(24), . . . , d(35)] may be mapped to a second orthogonal resource (#1) for transmission by a second antenna (#1) in the first slot; and [d(36), . . . , d(47)] may be mapped to the second orthogonal resource for transmission by the second antenna in the second slot.

Alternatively, [d(0), . . . , d(11)] may be mapped to a first orthogonal resource for transmission by a first antenna port in a first slot; [d(12), . . . , d(23)] may be mapped to a second orthogonal resource for transmission by a second antenna in the first slot; [d(24), . . . , d(35)] may be mapped to the first orthogonal resource for transmission by the first antenna in a second slot; and [d(36), . . . , d(47)] may be mapped to the second orthogonal resource for transmission by the second antenna in the second slot.

Figure 10:
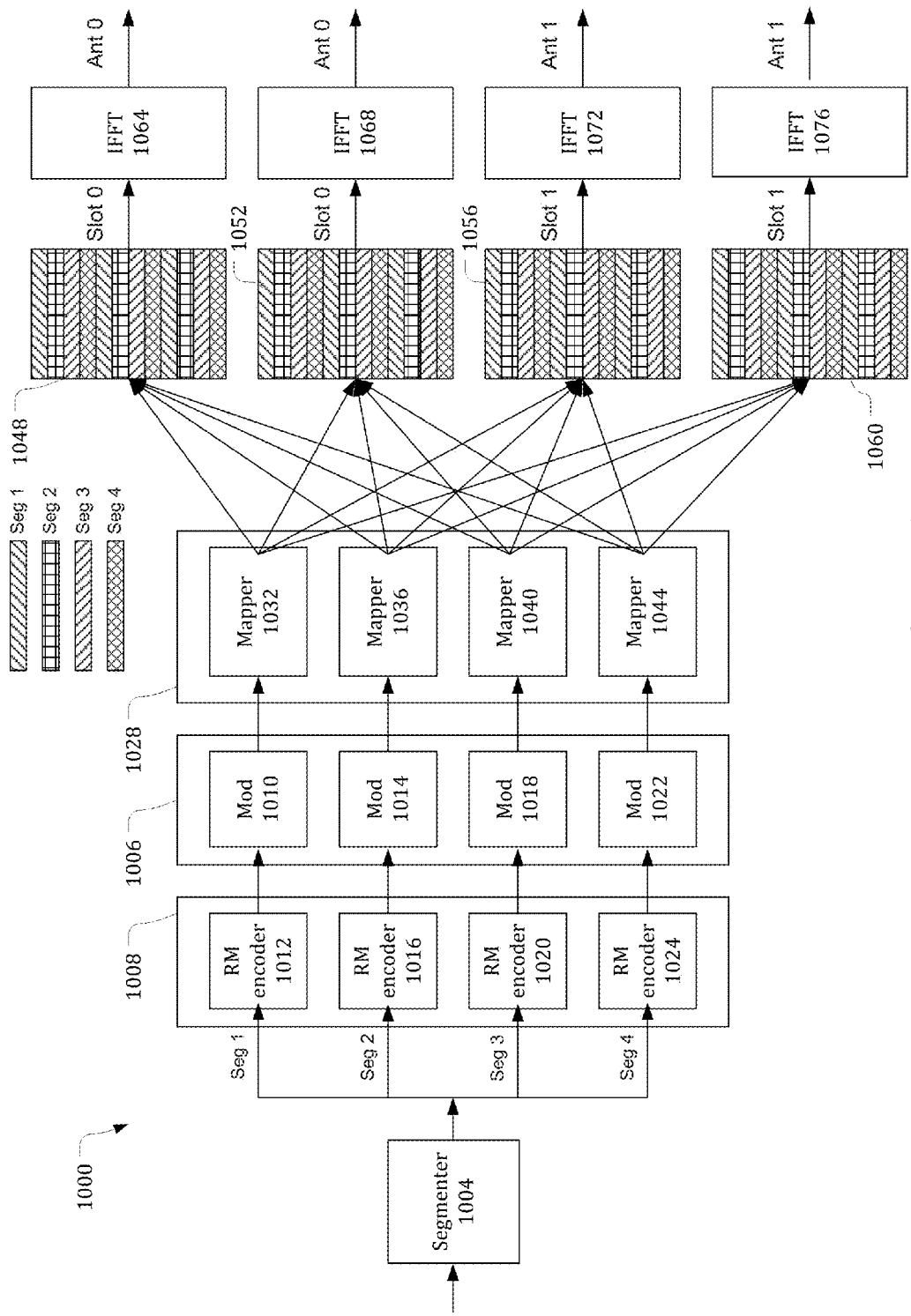
FIG. 10 illustrates transmit circuitry in accordance with various embodiments.

FIG. 10 illustrates Tx circuitry 1000 in accordance with another embodiment. The Tx circuitry 1000, which may be included in feedback circuitry 124, may be configured to transmit information according to PUCCH format 3. Operations of the components of Tx circuitry 1000 may be similar to operation of similar components described in other embodiments with any differences noted.

Tx circuitry 1000 may include a segmenter 1004 that is to receive p-CSI bits and segment the bits into four segments.

The Tx circuitry 1000 may include encoder circuitry 1008 having four RM encoders 1012, 1016, 1020, and 1024 that are coupled with the segmenter 1004 to respectively receive the four segments and encode the bits of the segments. The encoder circuitry 1008 may be referred to as a quad-RM encoder and may be used in place of TBCC encoder for large payload p-CSI transmissions. The RM encoders 1012, 1016, 1020, and 1024 may be, for example, (32, O) RM encoders with truncation. Each of the RM encoders 1012, 1016, 1020, and 1024 may output 24 encoded bits. Therefore, the total number of encoded bits may be 96.

The Tx circuitry 1000 may include modulator circuitry 1006 that includes four modulators 1010, 1014, 1018, and 1022 that are respectively coupled with RM encoders 1012, 1016, 1020, and 1024 to provide QPSK symbols, four example, 12 QPSK symbols per segment.

The Tx circuitry 1000 may further include mapper circuitry 1028 having four mappers 1032, 1036, 1040, and 1044 that are respectively coupled with the modulators 1010, 1014, 1018, and 1022, to receive the QPSK symbols of respective segments and map the encoded symbols onto different resources. Specifically, each mapper may map three QPSK symbols to each of four different DFT modules 1048, 1052, 1056, and 1060, as shown.

DFT modules 1048 and 1052 may be associated with a first slot, for example, slot 0, of a subframe, while DFT modules 1056 and 1060 may be associated with a second slot, for example, slot 1, of the subframe. The DFT modules and IFFT modules 1064, 1068, 1072, and 1076 may perform their respective transforms and provide the signals for transmission on shown antenna ports. Specifically, IFFTs 1064 and 1068 may be associated with a first antenna port, antenna port 0, and IFFTs 1072 and 1076 may be associated with a second antenna port, antenna port 1.

The interleaving of the modulation symbols onto orthogonal PUCCH format 3 resources for different antennas and slots may increase frequency and spatial diversity gain.

The embodiments described herein can be applied when the UE is configured for transmitting LargePayLoadCSI-Transmission for more than 22 information bits. In this case, if configured, two orthogonal resources can be also given by RRC signaling. Or the first orthogonal resource (n_PUCCH^(3)) can be given by RRC and the second one can be given by the predetermined offset (e.g., n_PUCCH^(3)+1→Offset value 1). If not configured, the large payload transmission may not be performed. Since an orthogonal resource is a combination of OCC index and a PRB index, two different orthogonal resources for two antennas may be orthogonally multiplexed by (1) different OCC indices, (2) different PRB indices, or (3) either different OCC or different PRB indices.

In some embodiments, the indication using LargePayLoadCSITransmission may be done by a 2Tx antenna configuration. That is, if 2Tx antenna transmission is configured: for the information bits not more than 22, SORTD may be used using RM (4~11 bits) or dual RM (12~22 bits); for the information bits more than 22, the above-described embodiments using TBCC (23 bits~44 bits or 23 bits~55 bits) may be used (conveying 44 bits can represent four-cell p-CSI when there are 11 CSI bits for each cell, conveying 55 bits can represent five-cell p-CSI when there are 11 CSI bits for each cell).

Figure 11:
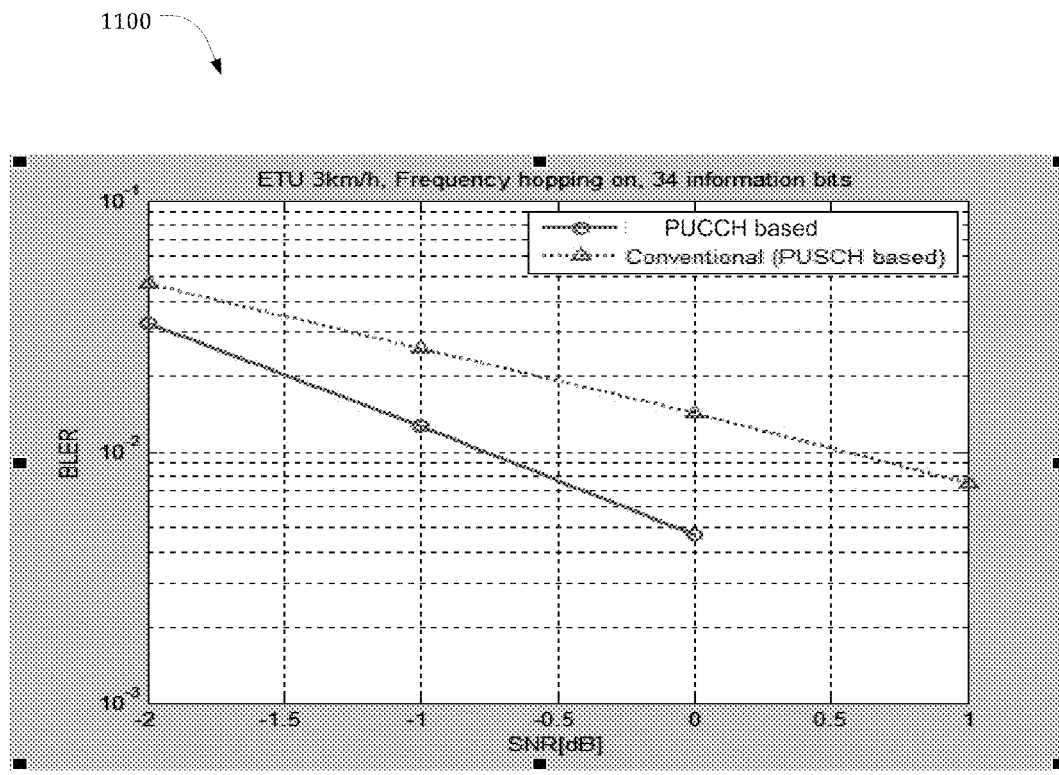
FIGS. 11-12 are graphs showing simulation results for PUCCH-based CSI feedback in accordance with quad-RM encoder embodiments and PUSCH-based CSI feedback for 34 information bits and 36 information bits.
Figure 12:
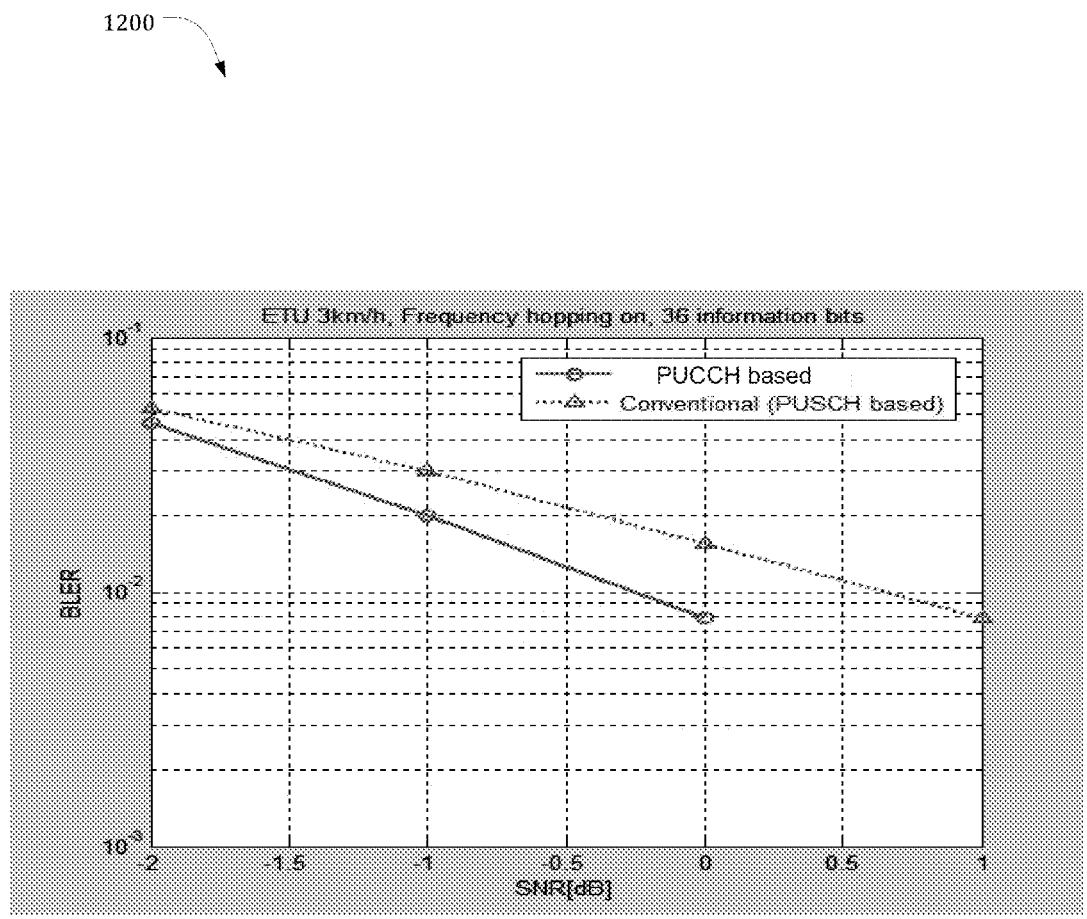

FIGS. 11 and 12 are graphs 1100 and 1200 showing simulation results for PUCCH-based CSI feedback in accordance with 2Tx antenna configuration and TBCC embodiments and PUSCH-based CSI feedback for 34 information bits and 36 information bits.

In some embodiments, power control for PUSCH-based UCI transmission may be improved by modification of the PUCCH power control processes. In general, the PUSCH-based UCI transmission may be regarded as a kind of a new PUCCH format, thus, the below description provides for PUSCH power control relying on modified concepts of the PUCCH formulas.

An RRC parameter for deltaF that corresponds to an offset associated with transmission of p-CSI on PUSCH may be provided to the communication device. The RRC parameter may be:

```
UplinkPowerControlCommon-v1020 ::=  SEQUENCE {
    deltaF-PUSCH-PCS1-r12  ENUMERATED {deltaF-1, deltaF0, deltaF1, deltaF2,
                                        deltaF3, deltaF4, deltaF5, deltaF6},
}
```

Another aspect that may be considered is the need to set up the h(.), in below equation, for PUSCH.

If a serving cell c is a primary serving cell, the setting of a UE transmit power, $P_{PUCCH}$, for the PUCCH transmission in subframe i may be defined by:

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} dBm \quad \text{Eq. 2}$$

If the UE is not transmitting PUCCH for the primary serving cell, for the accumulation of transmit power command (TPC) command received with downlink control information (DCI) format 3/3A for PUCCH, the UE may assume that the UE transmit power for the PUCCH transmission in subframe i may be computed by $$P_{PUCCH}(i) = \min\{P_{CMAX,c}(i), P_{0\_PUCCH} + PL_c + g(i)\} dBm \quad \text{Eq. 3}$$

where $P_{CMAX,c}(i)$ is a configured UE transmit power defined in 3GPP TS 36.101 v10.7.0 (13 Jul. 2012) in subframe i for serving cell c. If the UE transmits physical uplink shared channel (PUSCH) without PUCCH in subframe i for the serving cell c, for the accumulation of transmit power control (TPC) command received with downlink control information (DCI) format 3/3A for PUCCH, the UE may assume $P_{CMAX,c}(i)$ as given by §5.1.1.1 of 3GPP TS 36.213. If the UE does not transmit PUCCH and PUSCH in subframe i for the serving cell c, for the accumulation of TPC command received with DCI format 3/3A for PUCCH, the UE may compute $P_{CMAX,c}(i)$ assuming maximum power reduction (MPR)=0 dB, additional maximum power reduction (A-MPR)=0 dB, power management maximum reduction (P-MPR)=0 dB and an allowed operating band edge transmission power relaxation $(\Delta T_C)$=0 dB, where MPR, A-MPR, P-MPR and $\Delta T_C$ may be defined consistently with related definitions in 3GPP TS 36.101.

If the UE is configured by higher layers to transmit PUCCH on two antenna ports, the value of $\Delta_{T \times D}(F')$ may be provided by higher layers where each PUCCH format F' may be defined consistently with related definitions in Table 5.4-1 of 3GPP TS 36.211. If the UE is not configured by higher layers to transmit PUCCH on two antenna ports then $\Delta_{T \times D}(F')$=0.

Figure 13:
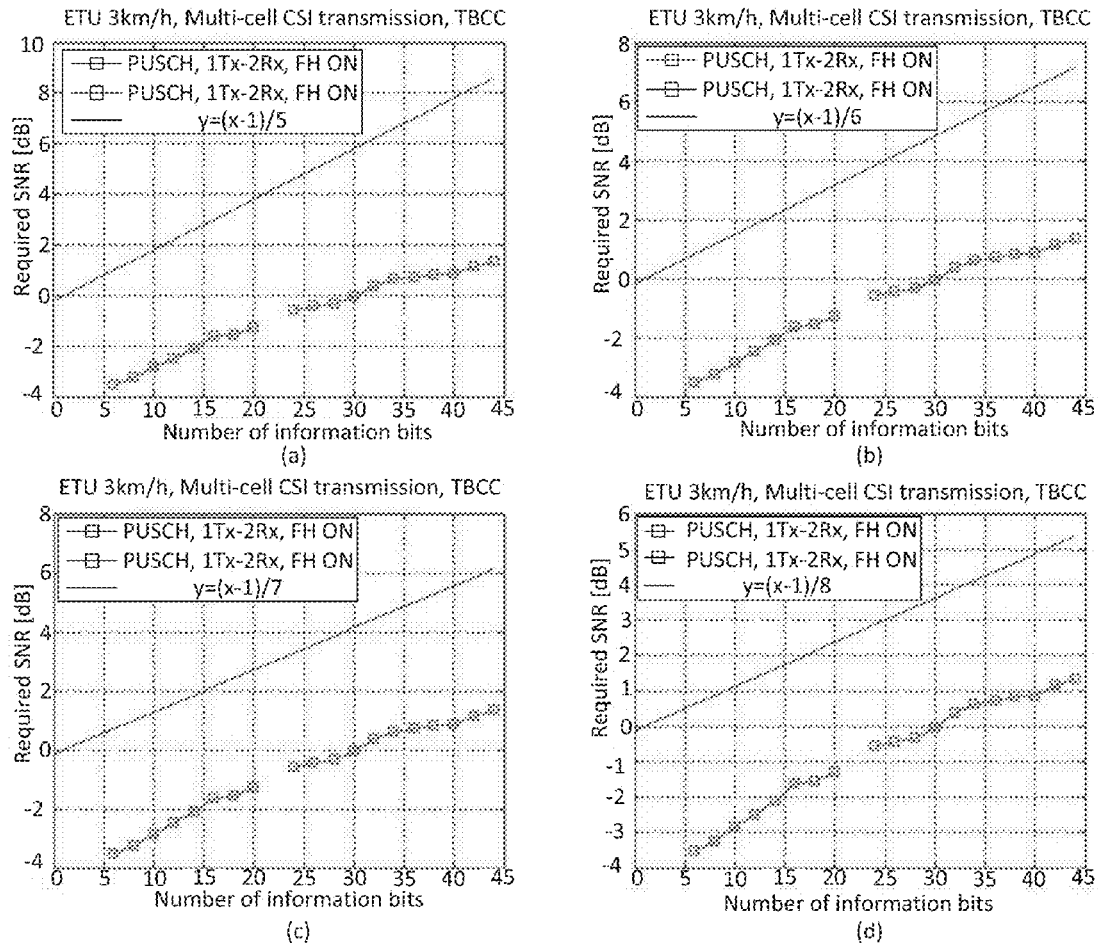
FIG. 13 includes graphs showing simulation results in accordance with some embodiments.

The delta F offset, $\Delta_{F\_PUCCH}(F)$, may be a performance offset value provided by higher layers for a PUCCH format (F) relative to PUCCH format 1a, where each PUCCH format (F) may be defined consistently with definitions in Table 5.4-1 of 3GPP TS 36.211.

$$h(n_{CQI}, n_{HARQ}, N_{SR}) = \frac{n_{HARQ} + n_{SR} - 1}{M},$$

where M is an arbitrary real value that is 5, 6, 7, 8, 9, or 10 and may be based on simulations of graphs of FIG. 13. In the graphs, an offset compensation by deltaF-PUSCH-PCSI-r12 has not been done. Thus, the important factor may be the slope of the first-order function.

If TBCC+SORTD is used, as described above, an RRC parameter for deltaF that corresponds to an offset associated with transmission of p-CSI using TBCC+SORTD may be provided to the communication device. The RRC parameter may be the following:

```
UplinkPowerControlCommon ::=    SEQUENCE {
   deltaF-PUCCH-SORTD-r12       ENUMERATED {deltaF-1, deltaF0, deltaF1, deltaF2,
                                            deltaF3, deltaF4, deltaF5, deltaF6},
   }
```

Alternatively, deltaF for TBCC+SORTD may use an existing one for PUCCH format 3 given as follows:

```
deltaF-PUCCH-Format3-r10     ENUMERATED {deltaF-1, deltaF0, deltaF1, deltaF2,
                                         deltaF3, deltaF4, deltaF5, deltaF6},
```

Figure 14:
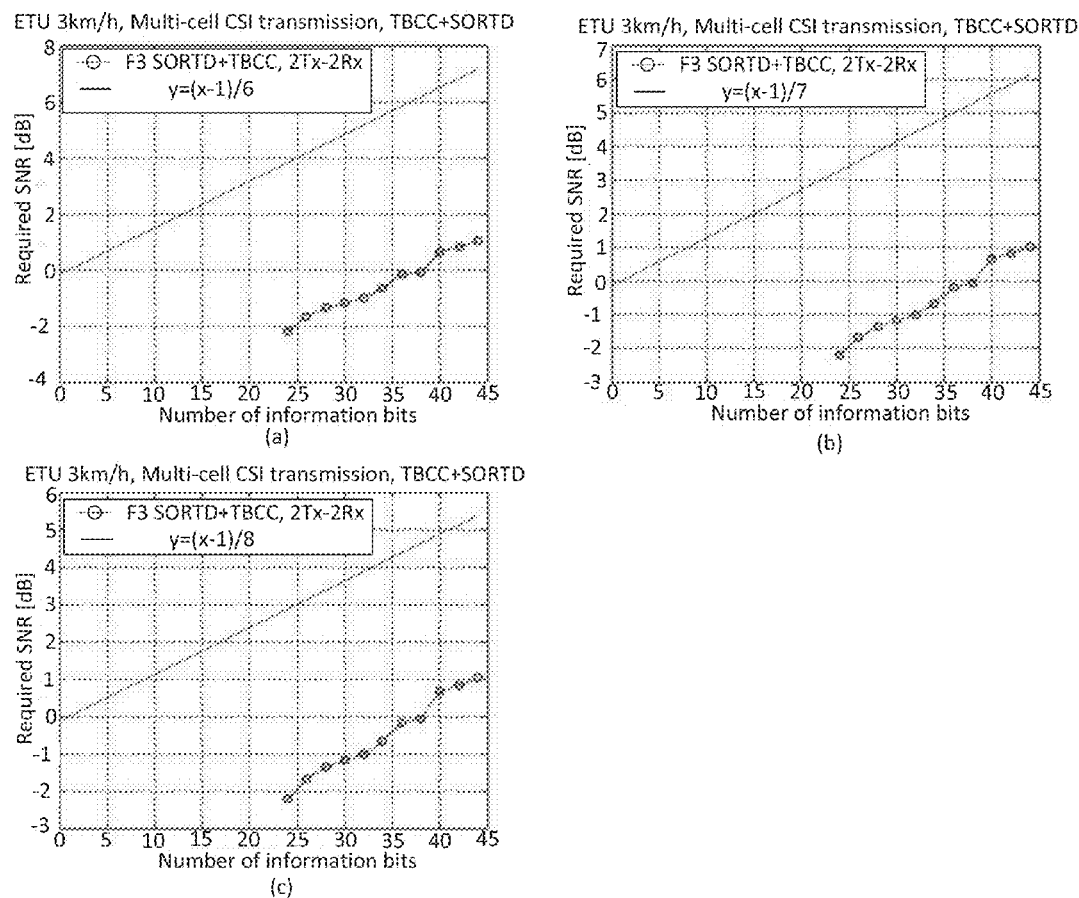
FIG. 14 includes graphs showing simulation results in accordance with some embodiments.

The h(.) function may be given as:

$$h(n_{CQI}, n_{HARQ}, n_{SR}) = \frac{n_{HARQ} + n_{SR} - 1}{M}$$

where M is an arbitrary real value that is 5, 6, 7, 8, 9, or 10 and may be based on simulations of graphs of FIG. 14. In the graphs of FIG. 14, an offset compensation by deltaF-PUSCH-pCSI-r12 has not been done. Thus, the important factor may be the slope of the first-order function.

Figure 15:
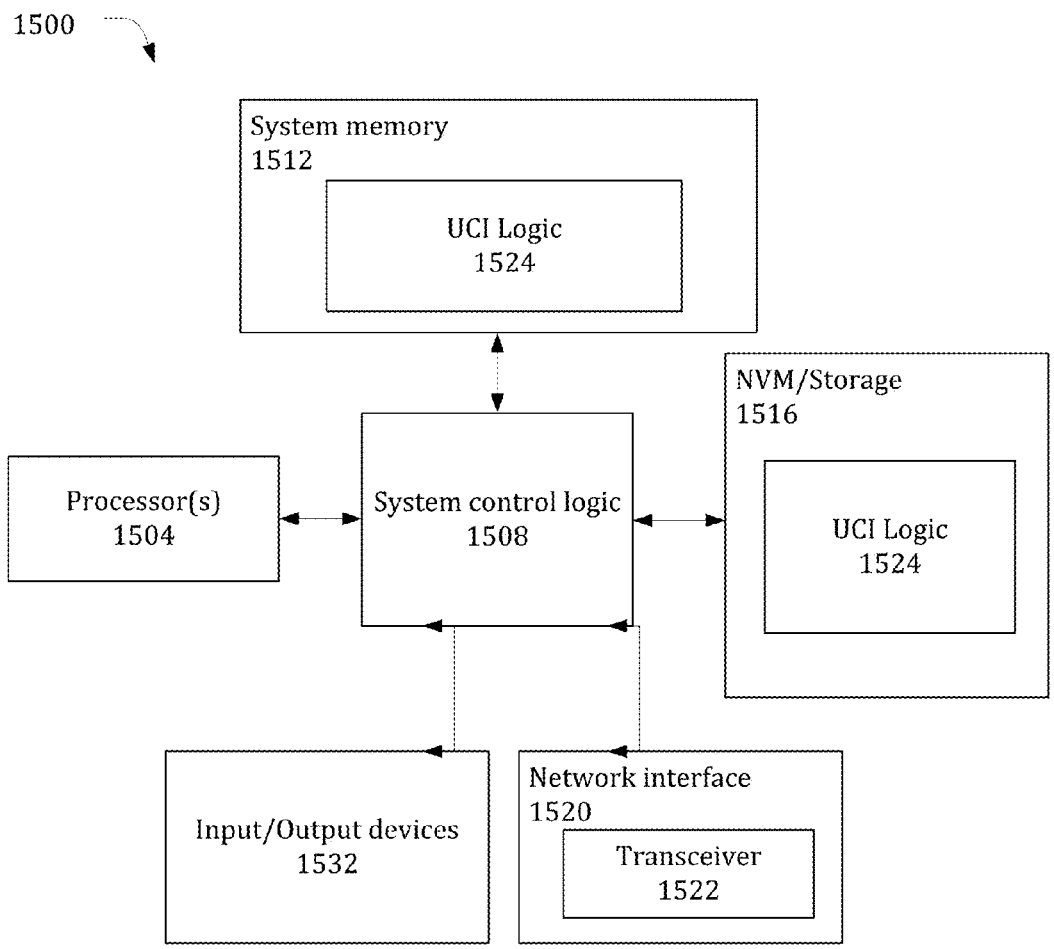
FIG. 15 schematically depicts an example system in accordance with various embodiments.

The UE 104 described herein may be implemented into a system using any suitable hardware and/or software to configure as desired. FIG. 15 illustrates, for one embodiment, an example system 1500 comprising one or more processor(s) 1504, system control logic 1508 coupled with at least one of the processor(s) 1504, system memory 1512 coupled with system control logic 1508, non-volatile memory (NVM)/storage 1516 coupled with system control logic 1508, a network interface 1520 coupled with system control logic 1508, and input/output (I/O) devices 1532 coupled with system control logic 1508.

The processor(s) 1504 may include one or more single-core or multi-core processors. The processor(s) 1504 may include any combination of general-purpose processors and dedicated processors (e.g., graphics processors, application processors, baseband processors, etc.).

System control logic 1508 for one embodiment may include any suitable interface controllers to provide for any suitable interface to at least one of the processor(s) 1504 and/or to any suitable device or component in communication with system control logic 1508.

System control logic 1508 for one embodiment may include one or more memory controller(s) to provide an interface to system memory 1512. System memory 1512 may be used to load and store data and/or instructions, e.g., UCI logic 1524. System memory 1512 for one embodiment may include any suitable volatile memory, such as suitable dynamic random access memory (DRAM), for example.

NVM/storage 1516 may include one or more tangible, non-transitory computer-readable media used to store data and/or instructions, e.g., UCI logic 1524. NVM/storage 1516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1516 may include a storage resource physically part of a device on which the system 1500 is installed or it may be accessible by, but not necessarily a part of, the device. For example, the NVM/storage 1516 may be accessed over a network via the network interface 1520 and/or over Input/Output (I/O) devices 1532.

The UCI logic 1524 may include instructions that, when executed by one or more of the processors 1504, cause the system 1500 to perform generation and feedback of UCI as described with respect to the above embodiments. In various embodiments, the UCI logic 1524 may include hardware, software, and/or firmware components that may or may not be explicitly shown in system 1500.

Network interface 1520 may have a transceiver 1522 to provide a radio interface for system 1500 to communicate over one or more network(s) and/or with any other suitable device. In various embodiments, the transceiver 1522 may be integrated with other components of system 1500. For example, the transceiver 1522 may include a processor of the processor(s) 1504, memory of the system memory 1512, and NVM/Storage of NVM/Storage 1516. Network interface 1520 may include any suitable hardware and/or firmware. Network interface 1520 may include a plurality of antennas to provide a multiple input, multiple output radio interface. Network interface 1520 for one embodiment may include, for example, a wired network adapter, a wireless network adapter, a telephone modem, and/or a wireless modem.

For one embodiment, at least one of the processor(s) 1504 may be packaged together with logic for one or more controller(s) of system control logic 1508. For one embodiment, at least one of the processor(s) 1504 may be packaged together with logic for one or more controllers of system control logic 1508 to form a System in Package (SiP). For one embodiment, at least one of the processor(s) 1504 may be integrated on the same die with logic for one or more controller(s) of system control logic 1508. For one embodiment, at least one of the processor(s) 1504 may be integrated on the same die with logic for one or more controller(s) of system control logic 1508 to form a System on Chip (SoC).

In various embodiments, the I/O devices 1532 may include user interfaces designed to enable user interaction with the system 1500, peripheral component interfaces designed to enable peripheral component interaction with the system 1500, and/or sensors designed to determine environmental conditions and/or location information related to the system 1500.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1520 to communicate with components of a positioning network, e.g., a global positioning system (GPS) satellite.

In various embodiments, the system 1500 may be a mobile computing device such as, but not limited to, a laptop computing device, a tablet computing device, a netbook, a smartphone, etc. In various embodiments, system 1500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provide below.

Example 1 includes a communication device to be employed in a user equipment, the communication device comprising: uplink control information (UCI) circuitry to generate UCI that includes one or more sets of periodic channel state information (p-CSI) that respectively correspond with one or more serving cells or with one or more CSI processes; feedback circuitry coupled with the UCI circuitry, the feedback circuitry to: determine a number of encoded bits to convey the UCI; select an encoding scheme from a plurality of encoding schemes based on the number of encoded bits; and encode the UCI with the encoding scheme for transmission using physical uplink control channel (PUCCH) format 3.

Example 2 includes the communication device of example 1, wherein the number of encoded bits is less than 12 bits, the coding scheme is Reed Muller (RM) encoding, and the feedback circuitry comprises: a (32, O) RM encoder to encode the UCI with RM encoding.

Example 3 includes the communication device of example 1, wherein the number of encoded bits is greater than 11 and less than 23, the coding scheme is dual Reed Muller (RM) encoding, and the feedback circuitry comprises: two (32, O) RM encoders to encode the UCI with dual RM encoding.

Example 4 includes the communication device of example 1, wherein the number of encoded bits is greater than 23, the coding scheme is quad Reed Muller (RM) encoding, and the feedback circuitry comprises: four (32, O) RM encoders to encode the UCI with quad-RM encoding.

Example 5 includes the communication device of example 1, wherein the number of encoded bits is greater than 22, the coding scheme is tail biting convolutional encoding (TBCC), and the feedback circuitry comprises: a TBCC encoder to encode the UCI with TBCC.

Example 6 includes the communication device of example 4 or 5, wherein the feedback circuitry includes a plurality of transmitters configured to provide a plurality of PUCCH-resource based transmissions using more than one transmit antennae.

Example 7 includes the communication device of example 6, wherein the feedback circuitry is to provide spatial orthogonal resource transmit diversity (SORTD).

Example 8 includes the communication device of example 6, wherein the feedback circuitry is configured to turn off a frequency hopping function when using TBCC.

Example 9 includes the communication device of any of examples 1-5, wherein the plurality of serving cells comprises four or five serving cells.

Example 10 includes the communication device of any of examples 1-5, wherein the feedback circuitry is configured to select an encoding scheme from the plurality of encoding schemes based on a number of the plurality of serving cells.

Example 11 includes a communication device to be employed in a user equipment, the communication device comprising: a tail-biting convolutional code (TBCC) encoder configured to receive a plurality of bits that represents periodic channel state information (p-CSI) for one or more serving cells or one or more CSI processes and encode the plurality of bits; a quadrature phase shift keying (QPSK) modulator coupled with the TBCC encoder, the QPSK modulator to modulate the plurality of bits into a plurality of symbols; and a mapper coupled with the QPSK modulator, the mapper to interleave the plurality of symbols on first and second orthogonal physical uplink control channel (PUCCH) format 3 resources for different antennas and slots.

Example 12 includes the communication device of example 11, wherein the mapper is to: map a first set of the plurality of symbols onto a first resource for transmission by a first antenna in a first slot of a subframe; map a second set of the plurality of symbols onto a second resource for transmission by a second antenna in the first slot of the subframe; map a third set of the plurality of symbols onto the first resource for transmission by the first antenna in a second slot; and map a fourth set of the plurality of symbols onto the second resource for transmission by the second antenna in the second slot, wherein the second set includes symbols that are between symbols of the first set and the third set.

Example 13 includes the communication device of example 11, wherein the mapper is to: map a first set of the plurality of symbols onto a first resource for transmission by a first antenna in a first slot of a subframe; map a second set of the plurality of symbols onto the first resource for transmission by the first antenna in a second slot of the subframe; map a third set of the plurality of symbols onto a second resource for transmission by a second antenna in the first slot; and map a fourth set of the plurality of symbols onto the second resource for transmission by the second antenna in the second slot, wherein the second set includes symbols that are between symbols of the first set and the third set.

Example 14 includes the communication device of any of examples 11-13, wherein the plurality of symbols comprises 48 symbols.

Example 15 includes the communication device of any of examples 11-13, further comprising: feedback circuitry that includes the TBCC encoder, the feedback circuitry to determine the plurality of bits is greater than 22 and to provide the plurality of bits to the TBCC encoder based on said determination that the plurality of bits is greater than 22.

Example 16 includes the communication device of any of examples 11-13, further comprising: a scrambler coupled with the TBCC encoder and the modulator to scramble the plurality of bits, wherein the QPSK modulator is to modulate the scrambled plurality of bits into the plurality of symbols.

Example 14 includes a user equipment comprising: the communication device of any of examples 11-13; and a plurality of antennas coupled with the communication device.

Example 18 includes a communication device to be employed in a user equipment, the communication device comprising: encoder circuitry having four Reed Muller (RM) encoders to respectively receive four sets of bits that represent periodic channel state information (p-CSI) for one or more serving cells or CSI processes and encode the four sets of bits; modulator circuitry having four quadrature phase shift keying (QPSK) modulators respectively coupled with the four RM encoders to respectively modulate the four sets of bits into four sets of symbols; and mapper circuitry having four mappers, wherein a first mapper is coupled with a first QPSK modulator to receive a first set of the four sets of symbols and to map a first subset of the first set of symbols onto a first resource for transmission by a first antenna in a first slot of a subframe; map a second subset of the first set of symbols onto a second resource for transmission by the first antenna in the first slot of the subframe; map a third subset of the plurality of symbols onto a second resource for transmission by a second antenna in the second slot; and map a fourth subset of the plurality of symbols onto the second resource for transmission by the second antenna in the second slot, wherein the first and second resources are orthogonal to one another and are physical uplink control channel (PUCCH) format 3 resources.

Example 19 includes the communication device of example 18, further comprising: a segmenter coupled with the encoder circuitry, the segmenter to segment a plurality of bits into four sets of bits and provide the four sets of bits to the encoder circuitry.

Example 20 includes the communication device of example 18, further comprising: feedback circuitry that includes the encoder circuitry, the feedback circuitry to determine the plurality of bits is greater than 22 and to provide the plurality of bits to the TBCC encoder based on said determination that the plurality of bits is greater than 22.

Example 21 includes the communication device of any of examples 18-20, further comprising: four discrete Fourier transformers (DFTs) coupled with the four mappers, wherein each of the four mappers are to provide three symbols to each of the four DFTs.

Example 22 includes one or more computer-readable media having instructions that, when executed by one or more processors, cause a communication device to: generate uplink control information UCI that includes periodic channel state information (p-CSI) for one or more serving cells or CSI processes; determine an uplink transmit power to transmit the UCI on a physical uplink shared channel (PUSCH) based on $$h(n_{CSI}, n_{SR}) = \frac{n_{CSI} + n_{SR} + 1}{M},$$

where $n_{CSI}$ is a number of p-CSI bits, $n_{SR}$ is a number of scheduling resource bits, and M is a value that is 5, 6, 7, 8, 9, or 10.

Example 23 includes the one or more computer-readable media of example 22, wherein the instructions, when executed, cause the communication device to: receive a radio resource control (RRC) parameter for delta F that corresponds to an offset associated with transmission of p-CSI on PUSCH; and determine an uplink transmit power based on the RRC parameter.

Example 24 includes the one or more computer-readable media of example 22, wherein the instructions, when executed, cause the communication device to: receive a radio resource control (RRC) parameter for delta F that corresponds to an offset associated with transmission of p-CSI using tailbiting convolutional coding with spatial orthogonal transmit diversity.

Example 25 includes the one or more computer-readable media of any of examples 22-25, wherein the instructions, when executed, further cause the communication device to: determine the number of p-CSI bits; and selected a channel encoding scheme based on the number of p-CSI bits.

Example 26 includes a communication device to be employed in a user equipment, the communication device comprising: uplink control information (UCI) circuitry to generate UCI that includes one or more sets of periodic channel state information (p-CSI) that respectively correspond with one or more serving cells or with one or more CSI processes; feedback circuitry coupled with the UCI circuitry, the feedback circuitry to: determine a number of encoded bits of the p-CSI; select an encoding scheme from a plurality of encoding schemes based on the number of encoded bits; and encode the UCI with the encoding scheme for transmission using physical uplink control channel (PUCCH) format 3.

Example 27 includes the communication device of example 26, wherein the number of encoded bits is less than 12 bits, the coding scheme is Reed Muller (RM) encoding, and the feedback circuitry comprises: a (32, O) RM encoder to encode the UCI with RM encoding; the number of encoded bits is greater than 11 and less than 23, the coding scheme is dual Reed Muller (RM) encoding, and the feedback circuitry comprises: two (32, O) RM encoders to encode the UCI with dual RM encoding; or the number of encoded bits is greater than 23, the coding scheme is quad Reed Muller (RM) encoding, and the feedback circuitry comprises: four (32, O) RM encoders to encode the UCI with quad-RM encoding.

Example 28 includes the communication device of example 26, wherein the number of encoded bits is less than 12 bits, the coding scheme is Reed Muller (RM) encoding, and the feedback circuitry comprises: a (32, O) RM encoder to encode the UCI with RM encoding; the number of encoded bits is greater than 11 and less than 23, the coding scheme is dual Reed Muller (RM) encoding, and the feedback circuitry comprises: two (32, O) RM encoders to encode the UCI with dual RM encoding; or the number of encoded bits is greater than 22, the coding scheme is tail biting convolutional encoding (TBCC), and the feedback circuitry comprises: a TBCC encoder to encode the UCI with TBCC.

Example 29 includes the communication device of example 27 or 28, wherein the feedback circuitry includes a plurality of transmitters configured to provide a plurality of PUCCH-resource based transmissions using more than one transmit antennae and, optionally, is to provide spatial orthogonal resource transmit diversity (SORTD).

Example 30 includes the communication device of example 28, wherein the feedback circuitry is configured to turn off a frequency hopping function when using TBCC.

Example 31 includes one or more computer readable media having instructions that, when executed by one or more processors cause a communication device to: receive a plurality of bits that represents periodic channel state information (p-CSI) for one or more serving cells or one or more CSI processes and encode the plurality of bits using a tail-biting convolutional code (TBCC); modulate the plurality of bits into a plurality of symbols using quadrature phase shift keying (QPSK) modulation; and interleave the plurality of symbols on first and second orthogonal physical uplink control channel (PUCCH) format 3 resources for different antennas and slots.

Example 32 includes the one or more computer readable media of example 31, wherein the instructions, when executed, further cause the communication device to: map a first set of the plurality of symbols onto a first resource for transmission by a first antenna in a first slot of a subframe; map a second set of the plurality of symbols onto a second resource for transmission by a second antenna in the first slot of the subframe; map a third set of the plurality of symbols onto the first resource for transmission by the first antenna in a second slot; and map a fourth set of the plurality of symbols onto the second resource for transmission by the second antenna in the second slot, wherein the second set includes symbols that are between symbols of the first set and the third set; or map a first set of the plurality of symbols onto a first resource for transmission by a first antenna in a first slot of a subframe; map a second set of the plurality of symbols onto the first resource for transmission by the first antenna in a second slot of the subframe; map a third set of the plurality of symbols onto a second resource for transmission by a second antenna in the first slot; and map a fourth set of the plurality of symbols onto the second resource for transmission by the second antenna in the second slot, wherein the second set includes symbols that are between symbols of the first set and the third set.

Example 33 includes the one or more computer readable media of example 31 or 32, wherein the instructions, when executed, further cause the communication device to: determine the plurality of bits is greater than 22 and to encode the plurality of bits using the TBCC based on said determination that the plurality of bits is greater than 22; scramble the plurality of bits; and modulate the scrambled plurality of bits into the plurality of symbols.

Example 34 includes a method comprising: receiving four sets of bits that represent periodic channel state information (p-CSI) for one or more serving cells or CSI processes and encoding the four sets of bits with four Reed Muller (RM) encoders; modulating, with four quadrature phase shift keying (QPSK) modulators, the four sets of bits into four sets of symbols; and mapping, with a first mapper, a first subset of a first set of symbols onto a first resource for transmission by a first antenna in a first slot of a subframe, a second subset of the first set of symbols onto a second resource for transmission by the first antenna in the first slot of the subframe, a third subset of the plurality of symbols onto a second resource for transmission by a second antenna in the second slot, and a fourth subset of the plurality of symbols onto the second resource for transmission by the second antenna in the second slot, wherein the first and second resources are orthogonal to one another and are physical uplink control channel (PUCCH) format 3 resources.

Example 35 includes the method of example 34, further comprising: segmenting a plurality of bits into four sets of bits and provide the four sets of bits to the encoder circuitry.

Example 36 includes the method of example 34, further comprising: determining the plurality of bits is greater than 22 and providing the plurality of bits to a TBCC encoder based on said determination that the plurality of bits is greater than 22.

Example 37 includes the method of any of examples 34-36, further comprising: providing, with each of the four mappers, three symbols to four discrete Fourier transformers (DFTs).

Example 38 includes a user equipment configured to perform the method of any of examples 34-36.

Example 39 includes one or more computer-readable media having instructions that, when executed by one or more processors, cause a communication device to perform the method of any of examples 34-36.

Example 40 includes a communication device comprising: means to receive a plurality of bits that represents periodic channel state information (p-CSI) for one or more serving cells or one or more CSI processes and encode the plurality of bits using a tail-biting convolutional code (TBCC); means to modulate the plurality of bits into a plurality of symbols using quadrature phase shift keying (QPSK) modulation; and means to interleave the plurality of symbols on first and second orthogonal physical uplink control channel (PUCCH) format 3 resources for different antennas and slots.

Example 41 includes the communication device of example 40, further comprising: means to map a first set of the plurality of symbols onto a first resource for transmission by a first antenna in a first slot of a subframe; map a second set of the plurality of symbols onto a second resource for transmission by a second antenna in the first slot of the subframe; map a third set of the plurality of symbols onto the first resource for transmission by the first antenna in a second slot; and map a fourth set of the plurality of symbols onto the second resource for transmission by the second antenna in the second slot, wherein the second set includes symbols that are between symbols of the first set and the third set; or means to map a first set of the plurality of symbols onto a first resource for transmission by a first antenna in a first slot of a subframe; map a second set of the plurality of symbols onto the first resource for transmission by the first antenna in a second slot of the subframe; map a third set of the plurality of symbols onto a second resource for transmission by a second antenna in the first slot; and map a fourth set of the plurality of symbols onto the second resource for transmission by the second antenna in the second slot, wherein the second set includes symbols that are between symbols of the first set and the third set.

Example 42 includes the communication device of example 40 or 41, further comprising: means to determine the plurality of bits is greater than 22 and to encode the plurality of bits using the TBCC based on said determination that the plurality of bits is greater than 22; means to scramble the plurality of bits; and means to modulate the scrambled plurality of bits into the plurality of symbols.

What is claimed is:

1. An apparatus comprising:
   uplink control information (UCI) circuitry to generate UCI that includes one or more sets of periodic channel state information (p-CSI) that respectively correspond with one or more serving cells or with one or more CSI processes;
   feedback circuitry coupled with the UCI circuitry, the feedback circuitry to:
      determine a number of encoded bits to convey the UCI;
      select an encoding scheme from a plurality of encoding schemes based on the number of encoded bits and a number of the one or more serving cells; and
      encode the UCI with the encoding scheme for transmission using physical uplink control channel (PUCCH) format 3.

2. The apparatus of claim 1, wherein the number of encoded bits is less than 12 bits, the coding scheme is Reed Muller (RM) encoding, and the feedback circuitry comprises:
   a (32, O) RM encoder to encode the UCI with RM encoding.

3. The apparatus of claim 1, wherein the number of encoded bits is greater than 11 and less than 23, the coding scheme is dual Reed Muller (RM) encoding, and the feedback circuitry comprises:
   two (32, O) RM encoders to encode the UCI with dual RM encoding.

4. The apparatus of claim 1, wherein the number of encoded bits is greater than 22, the coding scheme is tail biting convolutional encoding (TBCC), and the feedback circuitry comprises:
   a TBCC encoder to encode the UCI with TBCC.

5. The apparatus of claim 4, wherein the feedback circuitry includes a plurality of transmitters configured to provide a plurality of PUCCH-resource based transmissions using more than one transmit antennae.

6. The apparatus of claim 5, wherein the feedback circuitry is to provide spatial orthogonal resource transmit diversity (SORTD).

7. An apparatus comprising:
   uplink control information (UCI) circuitry to generate UCI that includes one or more sets of periodic channel state information (p-CSI) that respectively correspond with one or more serving cells or with one or more CSI processes;
   feedback circuitry coupled with the UCI circuitry, the feedback circuitry to:
      determine a number of encoded bits to convey the UCI;
      select an encoding scheme from a plurality of encoding schemes based on the number of encoded bits; and
      encode the UCI with the encoding scheme for transmission using physical uplink control channel (PUCCH) format 3,
   wherein the number of encoded bits is greater than 23, the coding scheme is quad Reed Muller (RM) encoding, and the feedback circuitry comprises:
      four (32, O) RM encoders to encode the UCI with quad-RM encoding.

8. An apparatus comprising:
   uplink control information (UCI) circuitry to generate UCI that includes one or more sets of periodic channel state information (p-CSI) that respectively correspond with one or more serving cells or with one or more CSI processes;
   feedback circuitry coupled with the UCI circuitry, the feedback circuitry to:
      determine a number of encoded bits to convey the UCI, the number of encoded bits being greater than 22;
      select tail biting convolutional encoding (TBCC) as an encoding scheme from a plurality of encoding schemes based on the number of encoded bits; and
      encode the UCI with the encoding scheme for transmission using physical uplink control channel (PUCCH) format 3,
   wherein the feedback circuitry comprises a TBCC encoder to encode the UCI with TBCC; includes a plurality of transmitters to provide a plurality of PUCCH-resource based transmissions using more than one transmit antennae; and is to turn off a frequency hopping function when using TBCC.

9. The apparatus of claim 1, wherein the one or more serving cells comprises four or five serving cells.

10. An apparatus comprising:
    a tail-biting convolutional code (TBCC) encoder to receive a plurality of bits that represents periodic channel state information (p-CSI) for one or more serving cells or one or more CSI processes and encode the plurality of bits;
    a quadrature phase shift keying (QPSK) modulator coupled with the TBCC encoder, the QPSK modulator to modulate the plurality of bits into a plurality of symbols;
    a mapper coupled with the QPSK modulator, the mapper to interleave the plurality of symbols on first and second orthogonal physical uplink control channel (PUCCH) format 3 resources for different antennas and slots; and
    when the TBCC encoder is in use the frequency hopping function is turned off.

11. The apparatus of claim 10, wherein the mapper is to:
    map a first set of the plurality of symbols onto a first resource for transmission by a first antenna in a first slot of a subframe;
    map a second set of the plurality of symbols onto a second resource for transmission by a second antenna in the first slot of the subframe;
    map a third set of the plurality of symbols onto the first resource for transmission by the first antenna in a second slot; and
    map a fourth set of the plurality of symbols onto the second resource for transmission by the second antenna in the second slot,
    wherein the second set includes symbols that are between symbols of the first set and the third set.

12. The apparatus of claim 10, wherein the mapper is to:
    map a first set of the plurality of symbols onto a first resource for transmission by a first antenna in a first slot of a subframe;
    map a second set of the plurality of symbols onto the first resource for transmission by the first antenna in a second slot of the subframe;
    map a third set of the plurality of symbols onto a second resource for transmission by a second antenna in the first slot; and
    map a fourth set of the plurality of symbols onto the second resource for transmission by the second antenna in the second slot, wherein the second set includes symbols that are between symbols of the first set and the third set.

13. The apparatus of claim 10, wherein the plurality of symbols comprises 48 symbols.

14. The apparatus of claim 10, further comprising:
feedback circuitry that includes the TBCC encoder, the feedback circuitry to determine the plurality of bits is greater than 22 and to provide the plurality of bits to the TBCC encoder based on said determination that the plurality of bits is greater than 22.

15. The apparatus of claim 10, further comprising:
a scrambler coupled with the TBCC encoder and the modulator to scramble the plurality of bits,
wherein the QPSK modulator is to modulate the scrambled plurality of bits into the plurality of symbols.

16. The apparatus of claim 10, further comprising:
a communication device having the TBCC encoder, a QPSK modulator, and the mapper; and
a plurality of antennas coupled with the communication device.

17. An apparatus comprising:
encoder circuitry having four Reed Muller (RM) encoders to respectively receive four sets of bits that represent periodic channel state information (p-CSI) for one or more serving cells or CSI processes and encode the four sets of bits and wherein the received four sets of bits are greater than 22;
modulator circuitry having four quadrature phase shift keying (QPSK) modulators respectively coupled with the four RM encoders to respectively modulate the four sets of bits into four sets of symbols; and
mapper circuitry having four mappers, wherein a first mapper is coupled with a first QPSK modulator to receive a first set of the four sets of symbols and to map a first subset of the first set of symbols onto a first resource for transmission by a first antenna in a first slot of a subframe;
map a second subset of the first set of symbols onto a second resource for transmission by the first antenna in the first slot of the subframe;
map a third subset of the plurality of symbols onto a second resource for transmission by a second antenna in the second slot; and
map a fourth subset of the plurality of symbols onto the second resource for transmission by the second antenna in the second slot, wherein the first and second resources are orthogonal to one another and are physical uplink control channel (PUCCH) format 3 resources.

18. The apparatus of claim 17, further comprising:
a segmenter coupled with the encoder circuitry, the segmenter to segment a plurality of bits into four sets of bits and provide the four sets of bits to the encoder circuitry.

19. The apparatus of claim 17, further comprising:
feedback circuitry that includes the encoder circuitry, the feedback circuitry to determine the plurality of bits is greater than 22 and to provide the plurality of bits to a TBCC encoder based on said determination that the plurality of bits is greater than 22.

20. The apparatus of claim 17, further comprising:
four discrete Fourier transformers (DFTs) coupled with the four mappers,
wherein each of the four mappers are to provide three symbols to each of the four DFTs.

21. One or more non-transitory, computer-readable media having instructions that, when executed by one or more processors, cause a communication device to:
generate uplink control information UCI that includes periodic channel state information (p-CSI) for one or more serving cells or CSI processes;
determine an uplink transmit power to transmit the UCI on a physical uplink shared channel (PUSCH) based on $$h(n_{CSI}, n_{SR}) = \frac{n_{CSI} + n_{SR} + 1}{M},$$

where $n_{CSI}$ is a number of p-CSI bits, $n_{SR}$ is a number of scheduling resource bits, and M is a value that is 5, 6, 7, 8, 9, or 10.

22. The one or more non-transitory, computer-readable media of claim 21, wherein the instructions, when executed, cause the communication device to:
receive a radio resource control (RRC) parameter for delta F that corresponds to an offset associated with transmission of p-CSI on PUSCH; and
determine an uplink transmit power based on the RRC parameter.

23. The one or more non-transitory, computer-readable media of claim 21, wherein the instructions, when executed, cause the communication device to:
receive a radio resource control (RRC) parameter for delta F that corresponds to an offset associated with transmission of p-CSI using tailbiting convolutional coding with spatial orthogonal transmit diversity.

24. The one or more non-transitory, computer-readable media of claim 21, wherein the instructions, when executed, further cause the communication device to:
determine the number of p-CSI bits; and
select a channel encoding scheme based on the number of p-CSI bits.

* * * * *